United States Patent
Sneider et al.

(10) Patent No.: US 12,375,279 B2
(45) Date of Patent: Jul. 29, 2025

(54) ITEM-ACCESS-BASED ACTIVATION OF AN ITEM SET FOR AN ITEM-RESTRICTED TOKEN ASSOCIATED WITH A PRIMARY TOKEN

(71) Applicant: Capital One Services, LLC, McLean, VA (US)

(72) Inventors: Amanda Sneider, New York, NY (US); Allison Fenichel, Brooklyn, NY (US); Varun Gupta, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 495 days.

(21) Appl. No.: 17/810,749

(22) Filed: Jul. 5, 2022

(65) Prior Publication Data
US 2024/0015019 A1   Jan. 11, 2024

(51) Int. Cl.
| | |
|---|---|
| *H04L 9/32* | (2006.01) |
| *G06F 21/10* | (2013.01) |
| *G06Q 30/0601* | (2023.01) |
| *H04L 12/417* | (2006.01) |
| *G06F 21/33* | (2013.01) |

(52) U.S. Cl.
CPC .......... *H04L 9/3213* (2013.01); *G06F 21/101* (2023.08); *G06F 21/1014* (2023.08); *G06Q 30/0601* (2013.01); *H04L 9/3297* (2013.01); *H04L 12/417* (2013.01); *G06F 21/1015* (2023.08); *G06F 21/335* (2013.01)

(58) Field of Classification Search
CPC ....... H04L 9/3213; H04L 9/3297; H04L 9/32; H04L 12/417; G06Q 30/0601; G06F 21/10; G06F 21/1014; G06F 21/1015; G06F 21/30; G06F 21/335
See application file for complete search history.

(56) References Cited

U.S. PATENT DOCUMENTS

| | | | |
|---|---|---|---|
| 9,219,736 B1 * | 12/2015 | Lewis | ............ H04L 67/53 |
| 11,233,802 B1 | 1/2022 | Rudeanu et al. | |
| 2011/0209159 A1 * | 8/2011 | Baratz | ........ G06F 16/24575 707/E17.112 |
| 2014/0155022 A1 | 6/2014 | Kandregula | |
| 2017/0097982 A1 * | 4/2017 | Zhang | ............ G06F 16/9535 |
| 2018/0034850 A1 | 2/2018 | Turgeman | |

(Continued)

OTHER PUBLICATIONS

US Non-Final Office Action on U.S. Appl. No. 17/810,774 Dated Nov. 19, 2024 (21 pages).

*Primary Examiner* — Shaqueal D Wade-Wright
(74) *Attorney, Agent, or Firm* — Foley & Lardner LLP

(57) ABSTRACT

In some embodiments, an item-restricted access token may be bound to one or more items. In some embodiments, a first item that is accessible via a first website accessed by a user may be detected. Based on the detection and an authentication of a user, an item-restricted access token may be activated for accessing an item that corresponds to the first item. After the activation of the item-restricted token, a request may be obtained for an action related to a candidate item. The action related to the candidate item may be validated based on the item-restricted access token, where the validation indicates that the action related to the candidate item is valid based on a determination that the candidate item corresponds to the first item.

20 Claims, 5 Drawing Sheets

(56) References Cited

U.S. PATENT DOCUMENTS

| | | | |
|---|---|---|---|
| 2018/0109540 A1* | 4/2018 | Amar | H04L 63/0876 |
| 2019/0272530 A1* | 9/2019 | Yuan | G06Q 20/401 |
| 2020/0177942 A1* | 6/2020 | Wu | G06F 16/3347 |
| 2021/0314352 A1 | 10/2021 | Yadav et al. | |
| 2021/0352064 A1 | 11/2021 | Tsarfati et al. | |
| 2021/0385085 A1* | 12/2021 | Wang | H04L 9/12 |
| 2024/0281476 A1* | 8/2024 | Patt | G06F 16/275 |

\* cited by examiner

ITEM-ACCESS-BASED ACTIVATION OF AN ITEM SET FOR AN ITEM-RESTRICTED TOKEN ASSOCIATED WITH A PRIMARY TOKEN

BACKGROUND

Access tokens enable users to access resources of one or more entities. For instance, in the context of web services, in response to a user logging into a web service of an entity via a user device, the web service may issue a token (e.g., JSON web token or other token) to the user device. Each subsequent request of the user device to the web service will include the token, allowing the user to access services and other resources that are permitted with that token based on an authorization of the requests. In one use case, where the web service is a content aggregation platform, the token would enable the user to access resources of many different third-party entities, subject to the user's account with the aggregation platform already having the corresponding access rights.

SUMMARY

In one aspect, methods and systems are described herein for improvements related to binding items to access tokens (or other tokens) and uses thereof. As an example, methods and systems are described herein for generating one or more access tokens for a user (e.g., issued to the same account of the user), where each such token is configured to bind to a set of items in connection with use of the token for an action related to items (e.g., such that use of the token is restricted to items bound to the token). As another aspect, methods and systems are described herein for improvements to validating network operations based on uniform resource locator (URL) data. As an example, methods and systems are described herein for validating network operations by determining whether URL data corresponds to an entity associated with an access token.

As discussed above, in the context of a conventional content aggregation platform, in response to a user logging into the aggregation platform via a user device, the aggregation platform issues a token to the user device that enables the user device access to any content (e.g., resources, services, items, etc.) within the full scope of permissions assigned to the user's account. Such access may, for example, include access to resources of many different third-party entities without the user having to manually log in to the aggregation platform for each access request from the user device. However, a user may want to restrict access to one or more resources, services, or items to protect sensitive information, prevent nefarious uses of the resources or services, or prevent a data breach by nefarious entities.

For instance, where a user device is shared among multiple users (e.g., in a family setting), the owner of the user device may want other users to have access to certain resources, services, or other items, but not others. For example, the owner of the user device may want to allow other users access to play a videogame, access multimedia, or access other content but prevent access to user profile information which may contain sensitive information (e.g., account information, demographic information, identifying information, payment information, admin privileges, etc.). Additionally, the owner of the user device may also want to increase account/token use security by preventing access to malicious websites or monitoring for man-in-the-middle attacks. Conventional systems may aid in restricting access to one or more resources or services by requiring passwords, pass-phrases, or other secrets for such access, and may also require such passwords for validating such access. However, other users may learn these passwords thereby circumventing the conventional security mechanism in place. This may lead to a poor user experience and raise security concerns, as the user may reasonably expect that their sensitive information is protected, even when sharing a device among multiple users.

To overcome this, in some embodiments, restricted access tokens may be implemented. For example, restricted access tokens may restrict actions that are related to one or more items and such actions may be validated based on URL data corresponding to the entity related to the items. For example, actions performed by a user may be restricted to items bound to a restricted access token or entities that are bound to the restricted access token. In some embodiments, a restricted access token may be linked to a primary access token of an account of a user (e.g., a primary user). For example, as discussed above, the primary access token may be an access token issued by an aggregation platform linked to an account of the primary user to allow a user device access to a variety of items (e.g., resources, services, etc.) across a variety of entities (e.g., service providers, companies, merchants, organizations, other entities, etc.). Prior to binding a restricted access token to one or more items, the system may detect an item that is accessible via a website associated with an entity, and may store information related to the item (e.g., an item identifier or other item-related information) and the entity (e.g., URL data, an entity identifier, or other entity-related information).

As an example, a primary user may navigate to a company's website hosting an item and the system may detect the item being accessible by the user and may store information related to the item and the entity. Based on such detection and an authentication of the user, the system may then bind the item to a restricted access token for accessing the item (and other items that correspond to the item). In this way, any subsequent use of the restricted access token (e.g., by secondary users, or alternatively, the primary user) may be restricted to actions that are related to items that correspond to the item (e.g., to which the item-restricted access token is bound) and any such actions may be further validated based on URL data corresponding to an entity that may be associated with the token, thereby improving the user experience and mitigating any security concerns by preventing a secondary user (or primary user) from (i) accessing any items that are not bound to the item-restricted access token or (ii) accessing items that are known to correspond to malicious entities.

In some embodiments, after the binding of the item-restricted access token, the system may obtain a request to use the token for a network operation related to a candidate item accessible via an entity (e.g., the same entity, a different entity, etc.). The system may then perform a validation process for the network operation to determine whether the network operation is valid. For example, the validation process may indicate that the network operation is valid based on determining that the candidate item corresponds to one or more items to which the token is bound, or may indicate that the network operation is invalid based on determining that the candidate item does not correspond to one or more items to which the token is bound. Additionally, or alternatively, the validation process may indicate that the network operation is valid based on the URL data associated with the network operation (e.g., the access of the item)

corresponding to an entity that is approved (e.g., bound to the token), or may indicate that the network operation is invalid based on the URL data associated with the network operation corresponding to an entity that is not approved (e.g., not bound to the token). When the network operation is valid, the user may access the candidate item or may be provided with the candidate item. On the contrary, when the network operation is invalid, the user may not have access to the candidate item nor be provided with the candidate item.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
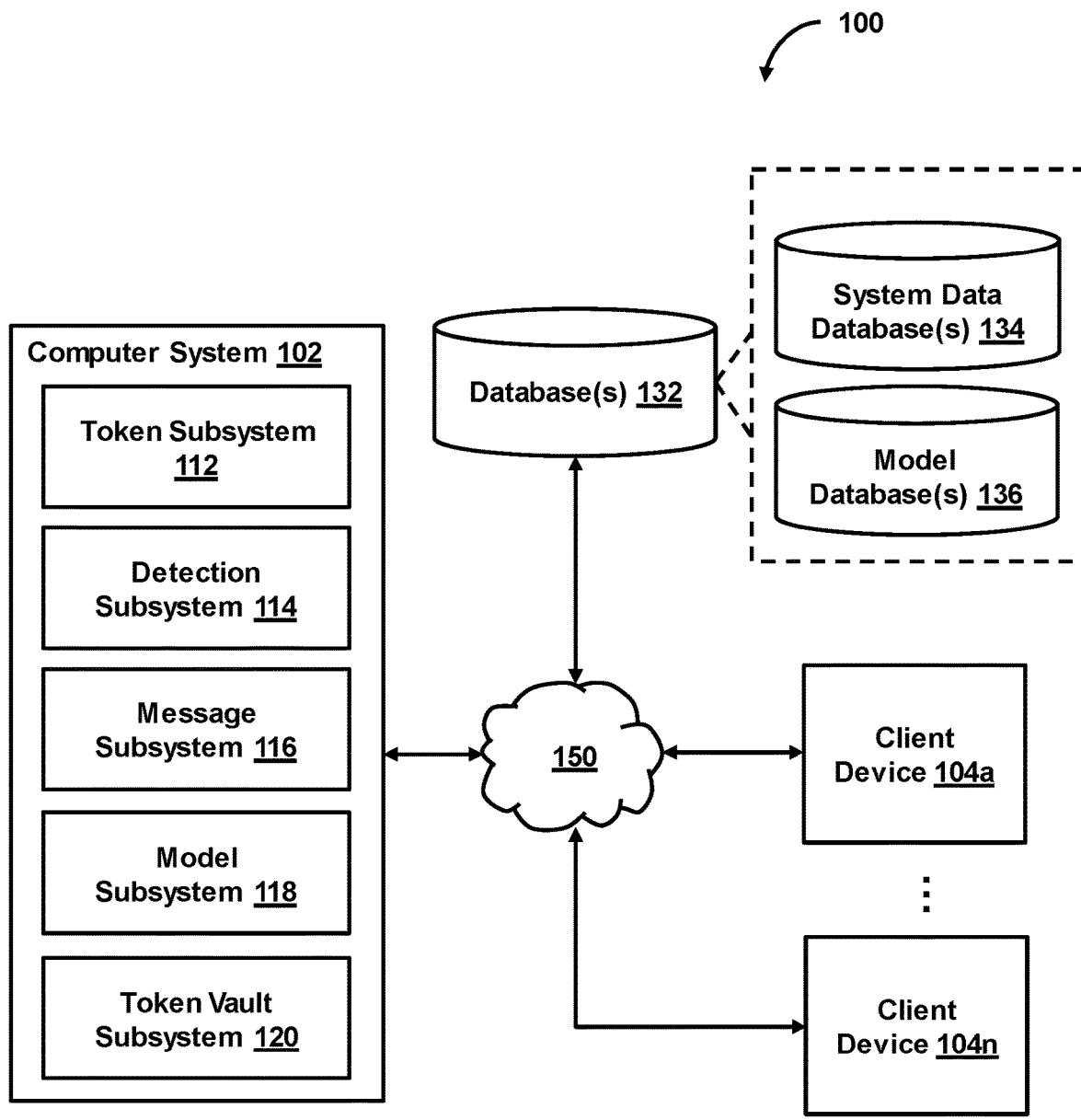
FIG. 1 shows a system for facilitating use of restricted access tokens, in accordance with one or more embodiments.

FIG. 1 shows a system 100 for facilitating use of restricted access tokens, in accordance with one or more embodiments. As shown in FIG. 1, system 100 may include computer system 102, client device 104 (or client devices 104a-104n), or other components. Computer system 102 may include token subsystem 112, detection subsystem 114, message subsystem 116, model subsystem 118, token vault subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may bind one or more items or entities to a token such that subsequent use of the token is restricted to (i) items bound to the token or (ii) entities bound to the token. As an example, the token may be any token that allows the performance of one or more actions, limited to items or entities that are bound to the token. As another example, the token may be a restricted token such as an item-restricted token, an entity-restricted token, or a combination thereof. An item may be any item that is accessible by a computing system or a user such as multimedia content (e.g., videogames, images, videos, text, etc.), products, services, resources, websites, or other items. Additionally, an action may be any interaction that a user or computing system may have with an item such as selecting an item, interacting with an item, viewing an item, gaining access to the item, manipulating an item, transacting with the item, a network operation related to the item, or other action associated with an item. As another example, an entity may be a company, merchant, service provider, organization, or other entity. System 100 may (i) detect a first item that is accessible via an entity, (ii) bind a token for accessing an item corresponding to the first item, (iii) store activity data associated with a subsequent use of the token for accessing an item, and (iv) validate the access of the item based on the user activity data. In this way, subsequent use of the token may be restricted to items corresponding to items bound to the token, and such use may be validated based on user activity data stored at the time of use of the token, thereby improving the user experience and alleviating security concerns as users using the token may only have access to items which correspond to the token.

In some embodiments, system 100 may detect a first item. For example, system 100 may detect a first item that is accessible by a user or computing system. Based on such detection, system 100 may authenticate the user. For example, the user may be authenticated based on a token used to interact with an item, a web browser identifier, an Internet Protocol (IP) address, biometrics, password, passcode, passphrase, geometric pattern, etc. Based on the detection of the first item and the authentication of the user, system 100 may bind a token for accessing an item corresponding to the first item. In some embodiments, where the user is authenticated and a first item has been detected, the first item may be bound to the token such that subsequent use of the token is restricted to items corresponding to the first item (e.g., to which the token is bound). In this way, after the binding of the first item, the token may only be used in association with actions related to items that correspond to item(s) bound to the token, thereby reducing fraud, increasing security (e.g., of the use of the token), and increasing the user experience. Additionally, by capturing the first user activity data, any entities associated with the first item that a user wishes to be inaccessible (e.g., due to malicious intent of the entity, due to explicit content provided by the entity, etc.), when the time comes to validate an action request (e.g., use of the token), an additional layer of security may be provided by system 100.

After the binding, system 100 may obtain a request for an action related to an item. For example, the request may be any request that indicates an action that is related to an item. For instance, where a user has selected an item, the request may indicate such action (e.g., a network operation). In some embodiments, in connection with the use of the token (e.g., system 100 obtaining a request for an action related to an item), system 100 may store first user activity data associated with the user in association with the token. For example, the first user activity data may include data such as screen capture data, URL data, URL data corresponding to an entity associated with the item, timestamp information, values associated with a user's use of the token, or other user activity data. System 100 may perform a validation process of the action (e.g., as indicated by the request) to determine whether the action is valid (e.g., with respect to the action related to the item). For example, the action may be valid where the item corresponds to one or more items bound to the token, thereby indicating an approval of the action (e.g., as the item corresponds to a pre-bound item bound to the token). On the other hand, the action may be invalid where the item does not correspond to one or more items bound to the token, thereby indicating a denial of the action (e.g., as the item does not correspond to any pre-bound items bound to the token). Additionally, or alternatively, the validation process may also include validating the action based on the user activity data. For example, to ensure that any items which the user is acting upon is from a legitimate source (e.g., a non-malicious entity), system 100 may further validate the action associated with the item based on the user activity data. In this way, an additional layer of security may be implemented where a user may only have access to (i) items bound to the token and (ii) items from reputable entities, thereby improving the user experience and increasing system security.

Subsystems 112-120

In some embodiments, token subsystem 112 may bind a token for accessing an item that corresponds to a linked item. For example, the token may be a restricted access token in which access to items are limited to those linked to (e.g., bound to, associated with, limited to, etc.) the restricted access token. In some embodiments, the restricted access token may include one or more item parameters for each item bound to the token. For example, when items are bound to the restricted access token, each item may be associated with a set of item parameters. The item parameters may include an item identifier (e.g., an item name, a numerical value, an alphanumeric string, etc.), an expiration parameter (e.g., a date/time where the item-restricted access token may be used for accessing an item, a date/time range where the item-restricted access token may be used for accessing an item, etc.), one or more item timestamp parameters (e.g., a time/date at which the item is accessed, a time/date at which the item is acted upon, etc.), one or more entity parameters (e.g., entities that are associated with the item, entities that are associated with the token, etc.), one or more multimedia content parameters (e.g., images associated with the item, a video associated with the item, a webpage object associated with an item, etc.), one or more item values (e.g., text associated with the item, alphanumeric string associated with the item, a numerical value associated with the item, a price associated with the item, a URL associated with the item, etc.), or other parameters. In this way, a restricted access token may not merely be bound to a single item, but may include a plurality of items that are bound to the restricted access token. In some embodiments, the restricted access token may also have one or more account-related parameters associated with the token. For example, the account-related parameters may include information such as an account the token is linked to, a name of a user to which the token is associated with, an account identifier, an account number, or other account-related information. In this way, the token may be associated with an account such that a user may have access to any resources, services, or other items that the account holder has permission to access. In some embodiments, a restricted access token may be an item-restricted access token (e.g., where access to items are restricted to items that correspond to items bound to the token), an entity-restricted access token (e.g., where access to items are restricted to items that are associated with entities that are bound to the token), or a combination thereof. It should be noted that, although embodiments are described herein with respect to a restricted access token, it is contemplated that one or more other types of tokens may be used in lieu of the restricted access token in other embodiments.

Figure 2:
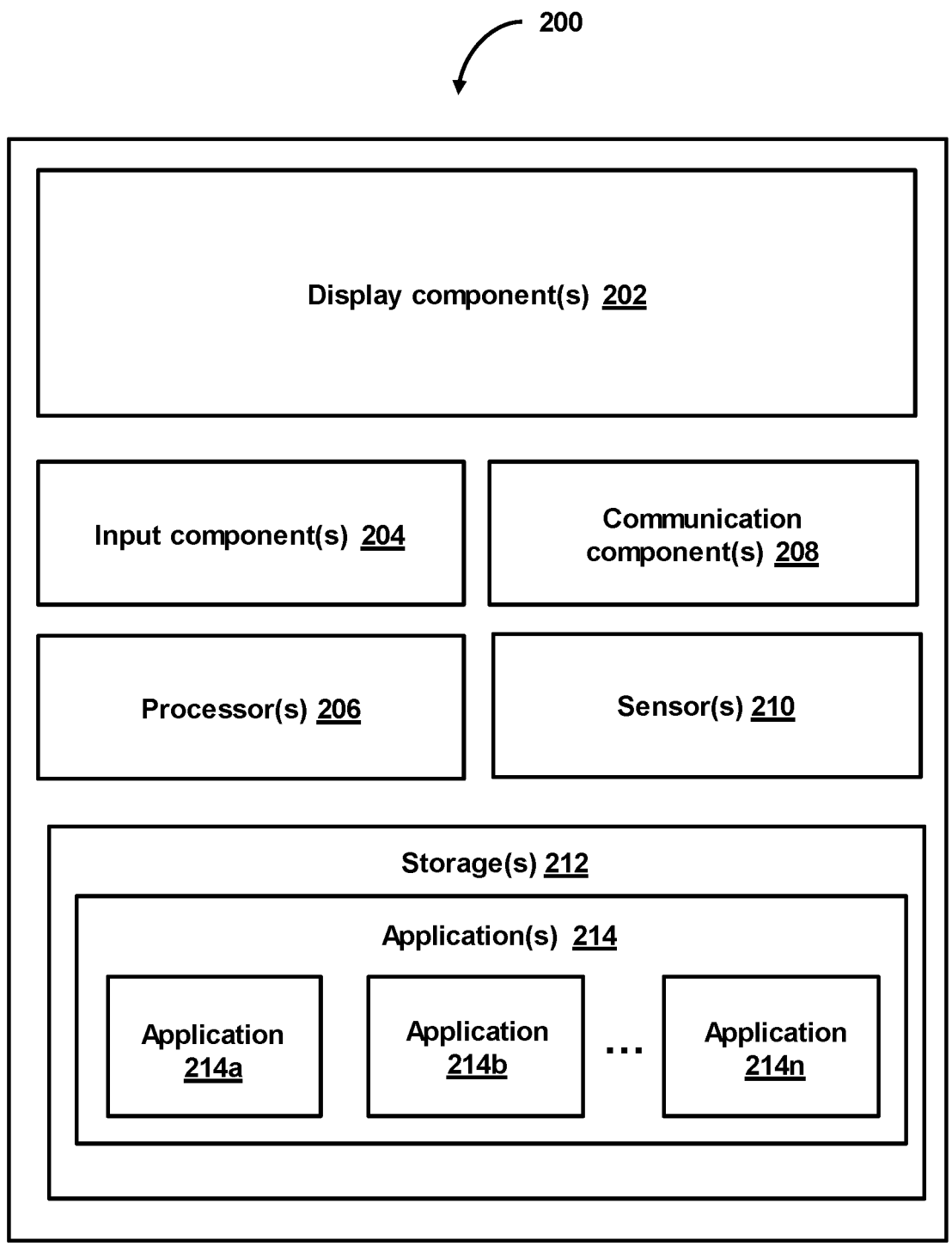
FIG. 2 shows a client device, in accordance with one or more embodiments.

In some embodiments, with respect to FIG. 2, one or more operations related to token generation and the authentication system for binding entity-restricted access tokens to an entity set may be performed by client device 200. In some embodiments, client device 200 may correspond to client device 104 (FIG. 1). Client device 200 may include a plurality of components, such as display component(s) 202, input component(s) 204, processor(s) 206, communication components(s) 208, sensors(s) 210, storage(s) 212, application(s) 214, or other components. In some embodiments, storage 212 may store a variety of applications. For example, applications 214a-214n may represent different applications stored on client device 200. As another example, application 214 may be an application that is configured as a web browser for interacting with one or more entities over network 150. For instance, application 214 may be configured to allow a user to perform one or more actions using an item-restricted access token, consistent with one or more embodiments. As another example, communication components 208 may be configured for receiving one or more messages (e.g., text messages, emails, notifications, mobile notifications, etc.) that may be displayed to a user via display components 202, in accordance with one or more embodiments. It should be noted that "client device" and "user device" may be used interchangeably and may refer to one or more of the same devices or one or more different devices, based on context of the discussion.

Referring back to FIG. 1, in some embodiments, a token may be activated based on the detection of a first item. For example, detection subsystem 114 may detect items accessible via a website that is accessed by a user (or alternatively, a user device). Detection subsystem 114 may be associated with an application hosted on the user device that is configured to detect accessible items. For example, the application may be an embedded application, a web browser plug-in, or other application hosted on a user device. As such, detection subsystem 114 may monitor websites/ webpages that are accessed for item-related information. For instance, when a user navigates to a webpage, detection subsystem 114 may perform one or more extraction techniques to determine whether items are accessible. For instance, detection subsystem 114 may extract HTML code, JavaScript code, C++ code, C #code, Python code, or other code from a webpage. In some embodiments, where the user is accessing a website via a web browser, the web browser may include a plug-in configured to detect items presented on a website or webpage. As an example, the web browser plug-in may monitor the users browsing habits to detect items that may be accessible via websites. In some embodiments, detection subsystem 114 may be associated with such a web browser plug-in. Detection subsystem 114 may parse through extracted code to determine which items may be presented on the webpage. For example, detection subsystem 114 may parse through the extracted code to identify item parameters corresponding to items, or other item-related information. In some embodiments, the web browser plug-in may obtain an image stream of the user device representing a user browsing the first website and selecting items. As an example, the plug-in may obtain a screen capture of what the user is currently browsing to identify which items are currently being browsed. In some embodiments, detection subsystem 114 may employ Natural Language Processing (NLP) to detect the items or may employ one or more machine learning models trained on item information (e.g., stored in system data database 134) to detect the items (e.g., Neural Network (NN), Convolutional Neural Network (CNN), Recurrent Neural Network (RNN), Support Vector Machine (SVM), etc.). For example, detection subsystem 114 may provide extracted code associated with a webpage the user is currently browsing, an image stream, or other content, to one or more machine learning models to detect which items the user is currently browsing, extract item parameters, and store such item parameters in system data database 134, as will be discussed later. Once detection subsystem 114 has detected the items, item-related information (e.g., item parameters) corresponding to each respective item may be stored in system data database 134 for future use when (i) detecting items, (ii) training machine learning models, (iii) determining when items correspond to items bound to an item-restricted token, (iv) suggesting items to be bound, or (v) other future uses. As an example, the item-related information extracted by detection subsystem 114 may correspond to the item parameters, as discussed above, and may be stored in system data database 134.

In some embodiments, based on a detection of items, token subsystem 112 may activate a token. For example, activation of the token may include an activation for use of the token, a generation of a token, a selection of a token, a binding of a token (e.g., binding items to a token), or other token activation. For instance, in a use case, a primary user (e.g., an account holder) may navigate to a website associated with an entity where items are accessible. As an example, an entity may be a company, merchant, service provider, organization, or other entity. A web service associated with the entity may have previously issued a primary token to the user device to allow the user device and/or the user access to items associated with the entity where such token may not be restricted to certain items. As discussed above, this may present a problem when a user device is shared among multiple users (e.g., a family setting) as other users may gain access to sensitive account information of the primary user. However, the primary user may still want other users to have access to certain items, services, or resources. To overcome this, token subsystem 112 may generate a restricted access token that is associated with (e.g., linked to, connected to, corresponds to, etc.) the primary token (or the primary user's account) such that other users may have access to certain items bound to the item-restricted access token, but not others. Similarly, the primary user may also use the restricted access token, for example, when the primary user is attempting to limit which item's they may have access for (e.g., preventing video game addiction by limiting access to such).

In some embodiments, message subsystem 116 may generate a message for display on a user device requesting activation of a restricted access token. For example, detection subsystem 114 may detect based on the primary user navigating to the webpage that one or more items are accessible via the website. Based on such detection, detection subsystem 114 may communicate with message subsystem 116 to generate a message querying the primary user for generation of a restricted access token. The message may include one or more user-selectable options indicating whether a restricted access token should be generated. As an example, the message may include a "yes" option, "no" option, "approve" option, "decline" option, or the like. Alternatively, or additionally, where a restricted access token has been previously generated, the message may include an option to allow the user to select the previously generated restricted access token stored in one or more digital repositories associated with token vault subsystem 120. As an example, message subsystem 116 may interact with token vault subsystem 120 to (i) determine whether the user has any previously generated item-restricted access tokens and (ii) based on such determination, indicating there is at least one previously generated item-restricted token, allow a user to select any of the previously generated restricted access tokens. For instance, in some embodiments, token subsystem 112 may provide an account identifier associated with the primary access token (or user account) to token vault subsystem 120 where token vault subsystem 120 may retrieve a restricted token corresponding to the account identifier. In this way, a restricted access token need not be generated each time, but rather may subsequently have items bound to such token, thereby conserving computer memory.

In one use case, detection subsystem 114 may detect items accessible via a website associated with an entity. For example, a user may navigate to a website associated with a company that presents one or more items to the user. Where the user is accessing the website via a web browser that includes a web browser plug-in, the web browser plug-in may monitor for information indicating items being presented on a webpage, and extract item-related information and provide detection subsystem 114 with the item-related information. For instance, the web browser plug-in may obtain an image stream indicating what the primary user is currently browsing, and may provide the image stream to detection subsystem 114. Based on the obtained image stream, detection subsystem 114 may determine which items are currently presented to the user. For example, where the website is a video game platform, the image stream may indicate one or more video games to be accessed (e.g., launched), an account settings button, a web-link to be accessed, or other items. Message subsystem 116 may generate a message to be displayed on the user device, to the user, querying the user whether or not to generate a restricted access token (e.g., an item-restricted access token or other token) or to select a previously generated restricted access token. Where the user selects to generate/select a previously generated item-restricted access token, the item-restricted access token may be available for future binding of the one or more items to the item-restricted access token.

In another use case, the user may navigate to a website that is associated with a merchant where one or more products are accessible. For example, the user may navigate to their shopping cart (e.g., checkout cart) associated with the merchant. Detection subsystem 114 may detect items that are accessible in the user's shopping cart. Where a restricted access token is a virtual card number, based on such detection, token subsystem 112 may authenticate the user. For example, token subsystem 112 may authenticate the user based on the user's account accessing the merchant's website, or via a primary access token to which the user has permission to access the merchant's website. In some embodiments, the user may be authenticated by providing a password, passphrase, geometric pattern, biometrics, or other secret to ensure the identity of the user. Based on the detection of the product and the authentication of the user, detection subsystem 114 may communicate with message subsystem 116 to generate a message indicating whether a virtual card number should be generated or whether a previously generated virtual card number is to be selected. The user may select one or more options indicating generation of a virtual card number or selection of a previously generated virtual card number to allow the user to bind one or more products to the virtual card. For example, a user may want other users to be able to purchase products limited to those bound to a virtual card. In this way, a user may share a virtual card number with other users (e.g., family members, friends, co-workers, etc.) without the worry of the other users attempting to purchase products that are outside the bounds of which the virtual card is bound to, thereby improving the user experience and reducing fraud. Additionally, since the generated virtual card number is linked to a primary virtual card (e.g., primary token), the primary user (e.g., account holder) may have complete control over which items are bound to any generated or selected virtual card number, and may also control the activation or deactivation of any virtual card number at any time, further improving the user experience.

In some embodiments, based on authentication of the user and the detection of an item, token subsystem 112 may activate a restricted access token for accessing items. For example, token subsystem 112 may bind a restricted access token for accessing items that correspond to linked items. For instance, once the user (e.g., a primary user) is authenticated and detection subsystem 114 has detected items that are accessible by the user, token subsystem 112 may bind a restricted access token for accessing items corresponding to the detected items. As an example, where the restricted access token is an item-restricted access token, based on the detected items and authentication of the user, message subsystem 116 may (i) generate for display, a message indicating activation of an item-restricted access token and (ii) query the user for which items the user would like bound to the item-restricted access token. In this way, the user may activate an item-restricted token and subsequently bind detected items to the item-restricted token to allow any items that correspond to the items bound to the token to be accessible. As an example, message subsystem 116 may generate a message for display querying the user about which of the detected items the user would like to bind to the item-restricted access token. For instance, the message may include user-selectable options indicating the detected items. The user may select the at least one item by a tap, long press, swipe (e.g., swipe up, swipe down, swipe left, swipe right, etc.), or other selection method. The user may select at least one of the detected items for binding to the item-restricted access token, and based on such user selection, the item-restricted access token may be restricted to actions related to items that correspond to items that are bound to the item-restricted access token.

In a use case, a user may want other users to have access to playing videogames, but not to any of the user's account settings. For example, the user may navigate to a website hosting one or more online video games. Detection subsystem 114 may detect the video games and an account settings button. Message subsystem 116 may generate a message for display requesting a selection of the video games or the account settings. The user may select the video games, and based on such selection, an item-restricted access token may be bound to such video games. In this way, any subsequent use of the item-restricted access token may be limited to accessing items that correspond to the video game. For instance, when the item-restricted access token is used by another user (e.g., a family member of the user), the other user may only have access to the video games as opposed to the account settings of the user thereby improving the user experience and maintaining account security of the user.

In another use case, where an item-restricted access token is a virtual card number, a user may want to limit subsequent uses of the virtual card number to products that correspond to products bound to the virtual card number. For example, where a user accesses a website associated with a merchant where products are accessible, detection subsystem 114 may detect the accessible products. Based on the detection, message subsystem 116 may generate a message requesting the user to select products to be bound to the virtual card number. Upon a user selection of at least one product, token subsystem 112 may bind the virtual card number to the selected products. In this way, when another user uses the virtual card number, the other user may only be able to have access (e.g., able to purchase) products that correspond to the bound virtual card number. In this way, fraud may be reduced when a user provides another user with the virtual card number. For example, where a user provides the virtual card number to a family member to buy an apple from a grocery store, the family member may be limited to buying apples from the grocery store, but not any other products from the grocery store. Additionally, because the virtual card number is merely bound to the product, users may have the freedom to purchase any items (corresponding to those bound to the virtual card number) from any merchant, thereby improving the user experience.

In some embodiments, token subsystem 112 may obtain a request indicating use of a restricted access token. For example, token subsystem 112 may obtain a request for an action related to an item (e.g., a candidate item) where the request may indicate use of a token for accessing a candidate item. As an example, where a user is attempting to access a document from a document provider's website, token subsystem 112 may receive a request (e.g., from client device 104) indicating the user is attempting to access the document. As another example, where the item-restricted access token is a virtual card number, token subsystem 112 may receive a request indicating a user is attempting to purchase an item from a merchant website. In some embodiments, such requests may be a temporary authorization request (e.g., TEMP AUTH). For instance, since the requests are not yet validated, between the time of the request and the validation of the request, such requests may be temporarily authorized as a good faith indication.

In some embodiments, token subsystem 112 may obtain such request after the activation (or the binding) of the token. For instance, a user may use an item-restricted access token for a network operation to access items associated with another entity. The other entity may not be associated with (e.g., affiliated with, corresponding to, owned by) an entity that the items bound to the item-restricted access token are associated with. For example, where a user has previously bound items accessible from a first website associated with a first merchant to an item-restricted access token, the request may indicate use of the item-restricted access token for accessing items of a second website associated with a second merchant that is not associated with the first merchant. Similarly, in some embodiments where the first and second website are the same website (e.g., a content aggregation platform), but where the items accessible via the website are associated with different merchants, the request may indicate use of the item-restricted token for accessing items of the website that are associated with different merchants. However, since the item-restricted access token is only bound to the items and not to the entities, the user experience is improved by allowing users to access a broader range of items regardless of which entity the items may be associated with.

In some embodiments, in connection with the use of a token, detection subsystem 114 may store activity data. For example, token subsystem 112 may obtain a token request (e.g., from client device 104) indicating use of a token for an action related to a candidate item. The token request may include a user request for use of a token (e.g., an item-restricted token, an entity-restricted token, or other token). As an example, a user may navigate to a website to gain access to an item. The user may select the item and may request use of a token to gain access to the item. In some embodiments, where the token requested is an entity-restricted token, the user may indicate a request for such token where the entity-restricted token is associated with a first entity and the user. For example, the user may request a token that is bound to entities as opposed to items to prevent access to a malicious entity. Additionally, or alternatively, a user may request an item-restricted token, where the item-restricted token is bound to items, where each item is associated with an entity. In some embodiments, token subsystem 112 may receive the token request and may trigger detection subsystem 114 to obtain activity data. For example, the activity data may include an image stream from a user device (e.g., indicating items that are being accessed via the token, user interface images, images of what a web browser is displaying etc.), extracted computer code from a webpage (e.g., JavaScript code, HTML code, etc.), URL data associated with a website (e.g., the URL, domain name, domain identifier, etc.), textual data, multimedia content, timestamp information (e.g., corresponding to the time of use of the token, the time of a webpage access, the time a webpage was refreshed, time of an action request, etc.), entity information (e.g., an entity identifier associated with an item), or other activity data.

In some embodiments, as discussed above, detection subsystem 114 may be associated with an application hosted on the user device. Detection subsystem 114 may be further configured to obtain (or otherwise collect or monitor) activity data that is associated with the user's use of the token or a user's browsing habits. For example, the application may be an embedded application, a web browser plug-in, or other application hosted on the user device. In some embodiments, the user device (or alternatively, the application) may be configured to store activity data in a buffer of the user device that is configured to discard activity data after a threshold amount of time. For instance, the activity data may be discarded after a threshold amount of time (e.g., 1 second, 2 seconds, 1 minute, 2 minutes, 1 hour, 2 hours, 1 day, 2 days, etc.) to preserve user device memory.

In some embodiments, once the activity data has been obtained, detection subsystem 114 may extract information from the user activity data. For example, where the user activity data is an image stream from a user device, detection subsystem 114 may extract information from the image stream by performing Optical Character Recognition (OCR) on the image stream to convert information in the image stream to textual data. As another example, where the user activity data includes computer code extracted from a webpage (e.g., JavaScript code, HTML code, etc.), detection subsystem 114 may parse through the extracted code to obtain information related to the user's activities and convert it to textual data. For example, the extracted code may include information related to the webpage the user was visiting (e.g., based on URL data), items presented to the user (e.g., based on object data within the code), entity information, timestamp information, or other user activity information. In this way, the user activity data may be stored as textual data in system data database 134 to reduce the amount of computer memory required to store such information. Additionally, by storing the user activity data as textual data, subsequent queries of user activity data may be obtained more efficiently (as will be discussed later). In some embodiments, detection subsystem 114 may store activity data associated with a user in association with a token in a database. For example, in some embodiments, based on a detection of the token request, token subsystem 112 may trigger the storage of the user's activity data to be stored in system data database 134 in association with a token (e.g., the token used for the action related to the item). For instance, detection subsystem 114 may store URL data and first timestamps associated with the first URL data. The first timestamps may indicate a timestamp at which a user accessed a URL, a user's access of an item, or other timestamps.

In one use case, where the token is a virtual card number, a user may attempt to purchase an item using the virtual card number via a website associated with a merchant. For example, detection subsystem 114 may detect that a user may be at a checkout page of the merchant's website indicating a shopping cart where the user is selecting an option presented on the checkout page to purchase the item. The user may request to use the virtual card number to pay for the item (e.g., a token request), and based on the user's virtual card number request, detection subsystem 114 may trigger the web browser plug-in to capture user interface screenshots (e.g., of the users shopping cart) indicating the user's activity. The user interface screenshots may include information such as the URL of the checkout page, a time the screenshot was taken (e.g., via a clock on the user interface of the user's device), items the user is attempting to purchase, entities (e.g., merchants) associated with the items the user is attempting to purchase, entities associated with the URL of the checkout page, or other information. Detection subsystem 114 may extract such information (e.g., by converting the screenshot data to textual data) from the user interface screenshots and store the extracted information in system data database 134 in association with the virtual card number. In this way, the purchase request may be later validated based on the user's activity by querying the database-thus, improving the efficiency of querying for such user activity data, as opposed to searching for image data.

In some embodiments, a restricted token may be bound to items retroactively. For example, where the user is accessing a website via a web browser that does not include a web browser plug-in configured to monitor the user's browsing habits and the restricted token is an item-restricted token, the user may be unable to bind items to the item-restricted access token that the user is currently using. However, the user may want to bind items the user is currently accessing to an item-restricted access token. Thus, if a user proceeds to access items (e.g., play a videogame, access a document, purchase an item, etc.) via an item-restricted access token, the user may later navigate to the website previously accessed and bind the items the user has previously accessed to the item-restricted access token.

In one use case, where the restricted token is a virtual card number, the user may purchase one or more items using a virtual card number via a website. However, if a web browser the user is using does not include a web browser plug-in to monitor the user's browsing habits, the user may be unable to bind the purchased items to the virtual card number. To overcome this, once the user is able to access the website where the items have been purchased via a web browser that includes the web browser plug-in, token subsystem 112 may receive a request indicating that the user has purchased such items. As an example, the user may access an order history webpage associated with the website that includes the items the user has purchased. In such case, once token subsystem 112 has received the request, token subsystem 112 may interact with message subsystem 116 to allow message subsystem 116 to generate a message querying the user for which of the purchased items the user would like bound to the virtual card number. Upon a user selection of the purchased items, token subsystem 112 may bind the items to the virtual card number. In this way, the user experience is improved by the user being able to retroactively bind items to the item-restricted access token, regardless of having a web browser plug-in included in the web browser the user is currently using.

In some embodiments, token subsystem 112 may obtain an action request for an action involving use of the token. For example, subsequent to storage of user activity data, token subsystem 112 may obtain an action request for an action involving use of a token. For example, the action request may include a network request for a network operation involving the use of a token. For example, where a user is attempting to access an item (e.g., a candidate item or other item), the network request may be sent by a client device to token subsystem 112 to be validated. In some embodiments, the network request may be a temporary authorization. For example, the network request may indicate that a user has attempted to access an item, but prior to allowing the user access to an item, the network request may need to be validated. In some embodiments, the network request may include a description. For example, the description may include a description of the network request indicating the token used in association with the network request, the origin of the network request (e.g., a domain name of the entity the action request came from, URL data associated with the entity, etc.), a timestamp of the network request, values associated with the network request (e.g., integers, decimals, or other numerical values), or other information. In this way, as will later be explained, the network request may be validated based on determining whether the network request corresponds to a user's activity data associated with the network request.

In one use case, where the token is a virtual card number, token subsystem 112 may obtain a temporary authorization for purchasing an item. For instance, the temporary authorization may include information indicating a description of a purchase request for an item. As an example, the description may indicate an entity associated with the purchase request (e.g., a merchant from which the user is attempting to purchase an item, URL data associated with the merchant's website, or other entity information), a timestamp of the purchase request, price information of the item, the virtual card number (e.g., the virtual card number used to purchase the item), or other information.

In some embodiments, token subsystem 112 may perform validation of an action related to an item based on the token. For instance, the validation may be a validation process for an action related to a candidate item to be accessed based on the token. For example, the action may be valid based on a determination that the candidate item corresponds to a linked item (e.g., an item bound to a restricted access token). In some embodiments, where a restricted access token is an item-restricted access token, a candidate item may correspond to an item bound to the item-restricted token where (i) at least one candidate item parameter matches an item parameter of an item bound to the token, (ii) at least one candidate item parameter is similar to an item parameter of an item bound to the token, (iii) at least one candidate item parameter is a derivative (e.g., version) of an item parameter of an item bound to the token, or (iv) at least one candidate item parameter otherwise corresponds to an item parameter of an item bound to the token. As an example, a candidate item may correspond to an item bound to the item-restricted access token where the candidate item's identifier (e.g., item name, Unique Product Code (UPC) number, or other identifier) matches an item's identifier that is bound to the entity-restricted access token.

In a use case, where the restricted access token is a virtual card number, a user may attempt to purchase a product with the virtual card number. Token subsystem 112 may receive a purchase request to purchase the product, and may determine whether the purchase request is valid. For example, token subsystem 112 may communicate with detection subsystem 114 to determine whether the product identifier associated with the product (e.g., to be purchased) matches a product identifier associated with a product to which the item-restricted token is bound. For instance, where the product identifier is a UPC number, detection subsystem 114 may parse through the items currently bound to the virtual card number to find a match between the UPC number of the product to be purchased, and a UPC number of a product bound to the virtual card number. Based on finding a match, detection subsystem 114 may communicate with token subsystem 112 to indicate that a match exists. In response to the matching, token subsystem 112 may validate the purchase request. In response to detection subsystem 114 determining that there is not a match, detection subsystem 114 may communicate with token subsystem 112 indicating there is not a match, and token subsystem 112 may deny (or otherwise invalidate) the purchase request. In this way, financial security may be increased by reducing fraud by only allowing products to be purchased that are currently bound to the virtual card number.

In some embodiments, token subsystem 112 may perform validation of an action request based on a description associated with the action request. For example, as described above, the description may include a description of the network request (e.g., the action request) indicating the token used in association with the network request, the origin of the network request (e.g., a domain name of the entity the action request came from, URL data associated with the entity, etc.), a timestamp of the network request, values associated with the network request (e.g., integers, decimals, or other numerical values), or other information. Token subsystem 112 may identify relevant information in the transaction description to validate the transaction. For example, token subsystem 112 may determine whether the entity information of the action request corresponds to an entity associated with the token used in connection with the action request. For example, where an entity-restricted access token was used to access an item, token subsystem 112 may determine whether there is a match between the entity associated with the entity-restricted access token and entity information included in the action request. Based on a match, token subsystem 112 may validate the action request. When token subsystem 112 does not identify a correct match, the action request may be invalid. However, in some instances where token subsystem does not identify a match, the request may implicitly be valid. For example, a common issue with content aggregation platforms exist where a user accesses an aggregation platform that allows access to a variety of entities hosting items available for access. For instance, the aggregation platform may act as a portal to numerous different websites and when an action request is received by token subsystem 112, the action request may include a description associated with the aggregation platform as opposed to the entity from which the user is accessing an item. To clarify, the aggregation platform may provide access to a first website, a second website, and a third website, where each of the aggregation platform and the first, second, and third websites are each associated with different entities. When a user attempts to access an item through the aggregation platform from the first website, the action request may include a description associated with the aggregation platform (e.g., indicating the aggregation platform's entity) as opposed to the first website's entity. Therefore, although token subsystem 112 may initially invalidate the action request, the action request may actually be valid. Thus, in response to the initial invalidation of the action request, token subsystem 112 may perform a secondary validation of the action request based on activity data. In this way, the user experience may be improved by performing a second validation process to action requests are correctly validated.

In some embodiments, token subsystem 112 may perform validation of an action request based on activity data. For example, token subsystem 112 may communicate with detection subsystem 114 to query system data database 134 for user activity data based on the action request. For instance, detection subsystem 114 may provide the token (e.g., the token itself, a token identifier, etc.) used for the action request and the time of the action request to system data database 134 to return user activity data that corresponds to the action request. For example, the user activity data returned by system data database 134 may include image-derived data (e.g., snapshot derived data, screenshot derived data, user interface derived data, etc.), such as data extracted from snapshot data.

In some embodiments, the query (e.g., for user activity data) may be performed based on whether the URL data corresponds to the entity associated with the token. For example, detection subsystem 114 may obtain a first entity based on the token. For example, the first entity may be associated with the token to allow a user to access one or more items. For instance, where the token is an entity-restricted token (e.g., a token that may be used for accessing items corresponding to a particular entity), detection subsystem 114 may obtain an entity identifier associated with the token. Detection subsystem 114 may also obtain the time at which the first action request was requested, and may provide the entity and the time of the first action request to system data database 134 to query (or otherwise search) for user activity data. As an example, detection subsystem 114 may determine whether the first entity (e.g., associated with the token) corresponds to first URL data of the user activity data and whether the first action request is within a threshold time of a timestamp associated with the first URL data of URL data. For instance, the first entity (associated with the token) may correspond to the first URL data based on a match. For example, the first URL data may include entity information. For example, the entity information may indicate an entity that is associated with the URL data (e.g., a domain name associated with the URL, an entity identifier associated with the URL, or other entity information associated with the URL data). Detection subsystem 114 may determine whether there is a match between the entity to which the token is associated and the entity associated with the URL data. In some embodiments, the entity associated with the token may not directly match the entity information of the first URL data. In such a case, detection subsystem 114 may provide the URL data and the entity associated with the token to a machine learning model to determine whether the URL data corresponds to the entity associated with the token (as will be explained later).

Detection subsystem 114 may also determine whether the first action request is within a threshold time of a first timestamp associated with the URL data. For example, the threshold time may be a predetermined time, such as 1 second, 2 seconds, 1 minute, 2 minutes, 1 hour, 2 hours, 1 day, 2 days, and so on. Detection subsystem 114 may compute a difference in time between the first action request and the first timestamp associated with the URL data, and determine whether the first action request and the first timestamp associated with the URL data is within the threshold time. For example, where the first action request was generated at 2:10 p.m. on Thursday, Mar. 17, 2022, and the first timestamp associated with the URL data (e.g., the time at which a user attempted to access an item) occurred at 2:09 p.m. on Thursday, Mar. 17, 2022, detection subsystem 114 may compute a difference of time to be 1 minute. If the threshold amount of time is 2 minutes, detection subsystem 114 may determine that the first action request occurred within the threshold amount of time of the first timestamp associated with the URL data. Based on (i) the entity associated with the token corresponding to the URL data and (ii) the first action request being within a threshold time of a first timestamp associated with the first URL data, detection subsystem 114 may return the user activity data. In this way, the system may return accurate user activity data corresponding to action requests such that the action requests may be validated.

In one use case, where the first action request is a temporary authorization and the token is a virtual card number, detection subsystem 114 may obtain a first entity associated with the virtual card number. For example, the first entity may be a merchant associated with the virtual card number, where a user is able to purchase items associated with the merchant. Detection subsystem 114 may obtain, based on the virtual card number, the entity associated with the virtual card number. Detection subsystem 114 may query system data database 134 based on (i) the merchant and (ii) the time of the temporary authorization to obtain user activity data. For example, detection subsystem 114 may determine whether the merchant associated with the token corresponds to URL data of user activity data stored in system data database 134. Detection subsystem 114 may further determine whether the time of the temporary authorization is within a threshold time of a timestamp associated with the URL data. For example, where the user used the virtual card number to purchase an item through the merchant, as discussed above, user activity data was collected at the time of the purchase indicating information such as the item purchased, entity information (e.g., merchant information), URL-derived data (e.g., domain name, merchant identifier, etc.), timestamp data (e.g., the time at which the purchase request was made), or other information. Detection subsystem 114 may determine whether the time of the temporary authorization occurred within a threshold time of the purchase request-thereby ensuring that user activity data to be returned corresponds to the temporary authorization. Based on the merchant corresponding to the URL data and the temporary authorization being within a threshold time of the purchase request, detection subsystem 114 may return the user activity data associated with the purchase request to validate the temporary authorization.

In some embodiments, some items may be similar to one another but may not share a same item identifier. For example, items may be different versions of one another, different brands, different types, or share some other similar characteristic. To avoid errors that may impact the user experience, such as when item parameters may not exactly match, one or more prediction models may generate predictions indicating whether items correspond to items which are bound to an item-restricted access token. Similarly, activity data obtained may include entity information (e.g., a company identifier, a merchant identifier, etc.), but may not exactly match an entity name. For example, "Company A" may be associated with URL data indicating "CompanyA-.com." For validation purposes, such as the validation of a temporary authorization, to ensure that (i) an entity that is associated with a token may correspond to URL data or (ii) to determine entity information included in activity data, one or more prediction models may generate predictions indicating whether (i) URL data (or URL data-derived information) corresponds to an entity (or entity identifier) that may be associated with a token or (ii) whether entity information is included in activity data.

In some embodiments, model subsystem 118 may train or configure one or more prediction models to facilitate one or more embodiments described herein. In some embodiments, such models may be used to determine items that correspond to items bound to the token. In other embodiments, such models may be used to determine URL data that corresponds to entities. As an example, such models may be trained or configured to perform the foregoing functions by respectively mutually mapping input data and output data in nonlinear relationships based on learning (e.g., deep learning). Additionally, one or more pre-trained prediction models may be stored in model database 136. For example, model database 136 may store a plurality of machine learning models configured to generate predictions related to items that correspond to items bound to the token.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
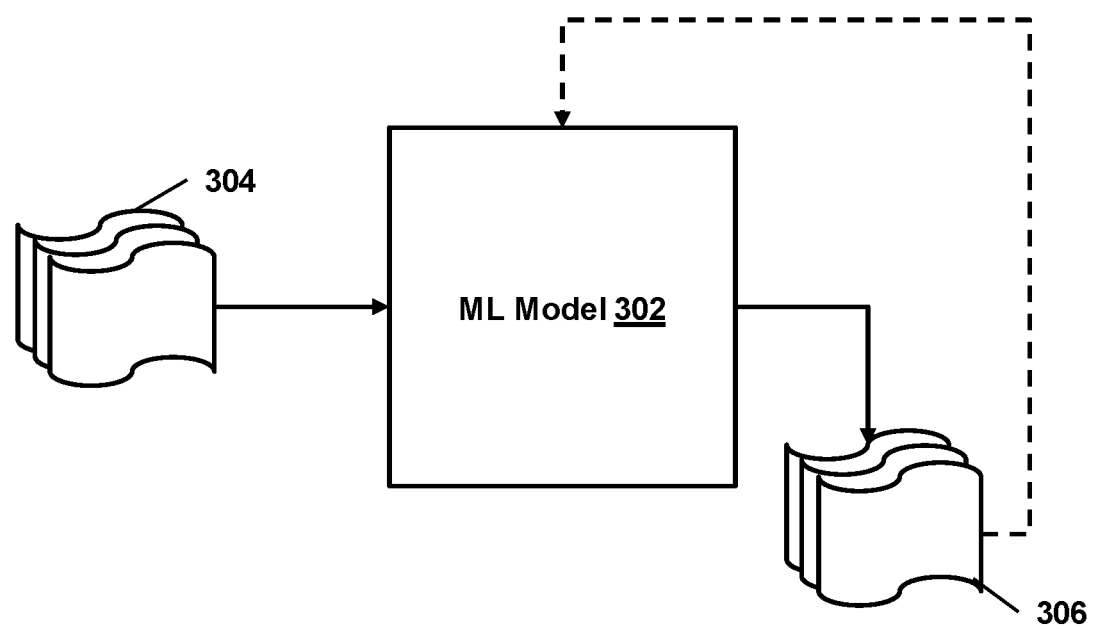
FIG. 3 shows a machine learning model configured to determine items that correspond to items bound to the item-restricted access token, in accordance with one or more embodiments.

As an example, with respect to FIG. 3, machine learning model 302 may take inputs 304 and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, machine learning model 302 may be trained based on system data database 134 to generate predictions related to items that correspond to items bound to the token. For example, system data database 134 may include item-related information such as item parameter information (e.g., item identifiers, item values, etc.), or other item-related information. As an example, system data database 134 may store item information (e.g., item parameters) corresponding to one or more respective items. In some embodiments, machine learning model 302 may be trained on item information from system data database 134. For instance, machine learning model 302 may take an item as input 304, and generate a set of other items as outputs 306 that correspond to (e.g., match to, similar to, a derivative of, a version of, etc.) the item provided as input 304. In some embodiments, machine learning model 302 may take an item as input 304 and generate a plurality of item sets that correspond to the input item as outputs 306. In some embodiments, the generated set of corresponding item(s) may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information). Additionally, it should be noted that although machine learning model 302 is configured to take an item as input 304, input 304 may be item parameter information (e.g., item parameters) and machine learning model 302 may provide outputs 306 indicating corresponding item parameter information.

In some embodiments, machine learning model 302 may take a set of items as input 304, and generate an output 306 indicating whether or not corresponding items exist within the set of input items. For example, machine learning model 302 may take (i) a candidate item (e.g., the item to be accessed) as a first input and (ii) a set of items bound to an item-restricted access token as a second input. As another example, machine learning model 302 may take (i) candidate item information (e.g., candidate item parameters) as a first input and (ii) a set of item information (e.g., set of item parameters) corresponding to respective items that are bound to an item-restricted access token as a second input. Machine learning model 302 may be configured to generate an output 306 indicating whether or not the candidate item corresponds (e.g., matches, is the same, similar to, a derivative of, etc.) to at least one item that is bound to the item-restricted access token. For example, in such a case, where the candidate item corresponds to at least one of the items bound to the item-restricted access token, output 306 may indicate a "yes," "approve," "positive," or other signal indicating that the candidate item corresponds to at least one item bound to the item-restricted access token. On the other hand, where the candidate item does not correspond to at least one of the items bound to the item-restricted access token, output 306 may indicate a "no," "deny," "negative," or other signal indicating that the candidate item does not correspond to at least one of the items bound to the item-restricted access token. It should be noted that output 306 may take the form of an alphanumeric string, a text string, a binary value, a hexadecimal value, or other value indicating whether or not the candidate item corresponds to at least one of the items bound to the item-restricted access token.

In some embodiments, machine learning model 302 may be trained based on system data database 134 to generate predictions related to which items are currently being browsed by a user. For instance, machine learning model 302 may take item-related data (e.g., an image stream, extracted computer code associated with a webpage, webpage text, or other multimedia content, etc.) associated with what a user may currently be browsing as input 304, and generate a prediction related to which items are currently being browsed by the user as output 306. For example, image stream of items the user is currently browsing may be provided to machine learning model 302 to generate a prediction indicating which items the user is currently browsing. For instance, as the input may be an image of an apple, machine learning model 302 may generate a prediction indicating that the image is an apple. Thus, such prediction may be used to create an item parameter such that the item may be bound to an item-restricted access token and the item parameter may be stored in system data database 134. In some embodiments, the outputs may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information).

As an example, referring back to FIG. 1, in some embodiments, model subsystem 118 may provide training data to a prediction model to train a prediction model to generate outputs indicating whether a candidate item corresponds to items bound to the item-restricted access token. For instance, in some embodiments, model subsystem 118 may obtain a prediction model (e.g., a machine learning model) from model database 136. In such a case, model subsystem 118 may train the selected prediction model based on training data (e.g., item information, item parameter information, other item-related information, etc.) stored in system data database 134. Once the prediction model is trained, detection subsystem 114 may provide a candidate item (or candidate item parameters) and any items bound to the item-restricted access token (or item parameters corresponding to items bound to the item-restricted access token) as input to the prediction model to generate a prediction indicating whether or not the candidate item corresponds to any of the items currently bound to the item-restricted access token. For example, detection subsystem 114 may provide a candidate item parameter, such as an item identifier to the prediction model. Additionally, detection subsystem 114 may provide item parameters, such as item identifiers, corresponding to items bound to the item-restricted access token to the prediction model. The prediction model may generate an indication whether the candidate item corresponds to at least one of the items bound to the item-restricted access token. For example, where the candidate item is a baseball a user is attempting to purchase, detection subsystem 114 may provide the item name (e.g., "baseball") to the prediction model as input. Additionally, detection subsystem 114 may provide item names of the items bound to the item-restricted access token to the prediction model. The prediction model may generate a prediction indicating whether or not the candidate item corresponds to at least one of the items bound to the item-restricted access token. As another example, the prediction model may take multiple candidate item parameters in as input, as well as multiple item parameters corresponding to respective items bound to the item-restricted access token to generate predictions related to whether the candidate item corresponds to one or more items bound to the item-restricted access token.

In some embodiments, referring back to FIG. 3, machine learning model 302 may be configured to output entity information that is included in user activity data. For example, machine learning model 302 may be trained based on system data database 134 to generate predictions outputting an entity identifier included in the user activity data. For example, machine learning model 302 may take user activity data in as input 304, and generate an output 306 indicating an entity included in the user activity data. For example, machine learning model 302 may take user activity data (e.g., associated with a token request) as input 304. Machine learning model 302 may be configured to generate an output 306 indicating an entity included in the user activity data. For example, in such a case, where an entity is derived from the user activity data, output 306 may indicate an entity identifier of the entity included in the user activity data. It should be noted that output 306 may take the form of an alphanumeric string, a text string, a binary value, a hexadecimal value, or other value indicating an entity identifier included in the user activity data.

As an example, where the user activity data includes image data (e.g., of a user interface at the time of a token request), machine learning model 302 may be provided with the image data as input. Machine learning model 302 may output an entity identifier that is identified in the user activity data. For example, machine learning model 302 may be configured for image-to-text synthesis (e.g., such as a Generative Adversarial Network) which may take in image data as input and produce textual data as output. In such case, machine learning model 302 may output an entity name that is associated with the user activity data. For example, where the user activity data includes URL data, machine learning model 302 may be configured to identify entity information associated with the URL data (e.g., domain name, entity name, merchant name, or other entity information). Machine learning model 302 may output an entity identifier to allow for a validation process to occur.

In some embodiments, machine learning model 302 may be configured to determine whether URL data corresponds to an entity. For example, machine learning model 302 may take user activity data in as a first input 304, and may take an entity (e.g., an entity identifier) associated with a token in as a second input 304. Machine learning model 302 may then generate an output 306 indicating whether the activity data includes entity information corresponding to the entity associated with the token. For example, in a use case, where the token is an entity-restricted token, machine learning model 302 may be provided with the entity that is associated with the token (e.g., an entity identifier, an entity name, etc.) and may also be provided with user activity data (e.g., URL-derived data) obtained at the time of a token request as input 304. Machine learning model 302 may generate an output 306 indicating whether the entity information in the activity data corresponds to the entity associated with the entity-restricted access token. As an example, the output may be a "yes," "no," "approve," "deny," "positive," "negative," or other indication. As another example, the output may also indicate the entity. For example, where the activity data includes a URL of "CompanyA.com" and the token is associated with an entity identifier of "Company A," the output 306 may indicate "Company A," thereby providing an indication that there is a correspondence between the entity information of the activity data and the entity information associated with the token.

In some embodiments, token subsystem 112 may bind a set of items to a token. For example, detection subsystem 114 may determine a plurality of item sets to be bound to a token. For example, the plurality of item sets may include a first item set and a second item set. The first item set may include a first item associated with a first item value and additional items associated with respective item values. For example, the item values may indicate an item parameter (e.g., item identifier, expiration parameter, timestamp parameters, entity parameters, multimedia content parameters, account association information, item values, or other item parameters). The second item set may include the first item value without the additional items being associated with respective item values. For example, the first item set may include a first item associated with a first item identifier and additional items being associated with other respective item identifiers, and the second item set may include a second item associated with the first item identifier, but the additional items of the second item set may not be associated with the other item identifiers.

In one use case, where the user is checking out with one or more products, the user's shopping cart may include a plurality of items, where each item is associated with an item identifier. To provide the user with a plethora of choices (e.g., recommendations that may correspond to items already in the user's shopping cart), detection subsystem 114 may detect the items in the user's shopping cart, and may query system data database 134 to return items that may correspond to items in the user's shopping cart. For example, detection subsystem 114 may provide respective item identifiers to system data database 134 to query system data database 134 for similar items to that of the items in the user's shopping cart. In some embodiments, detection subsystem 114 may rely on one or more machine learning models to generate an output indicating items that may correspond to items in the user's shopping cart.

Based on a return of the items that correspond to items in the user's shopping cart, detection subsystem 114 may determine a plurality of item sets. For example, detection subsystem 114 may generate a first item set that may include a first item associated with a first item identifier (e.g., a first item name of a first item in the user's shopping cart) and other items that correspond to the first item (e.g., of the returned set). Additionally, detection subsystem 114 may generate a second item set that may include the first item with the first identifier, but no other items (e.g., no additional items in the set, thus, having no other item identifiers). Based on the generation of the item sets, a message may be caused to be presented at a user device of a user. For example, the message may be a push notification, mobile notification, a text message (e.g., SMS message), an email, or other message. The message may request a user selection of an item set from the plurality of item sets to which the token is to be bound. For example, message subsystem 116 may generate a message for display at a user device configured to receive one or more user-selectable item sets of the determined plurality of entity sets. For instance, upon the message being displayed to the user, the user may select either the first or second item sets to which the token is to be bound. As discussed above, a user may select an item set by a tap, swipe, geometric patterns, or other selection method. Based on the user selection of an item set obtained via the message, the item-restricted token may be bound to the user-selected item set. For example, if the user selects the first item set, any items included in the first item set will be bound to the item-restricted access token.

In some embodiments, an action request may be validated based on timestamp information. For example, an action related to a candidate item may be validated based on timestamp information. Validating actions related to candidate items based on timestamp information may help ensure that a user who is attempting to access a candidate item is authorized to do so. For example, when timestamp information does not match up or correspond to one another, this may indicate that the user may have left the device and another user has since taken control of the device. By ensuring that timestamp information between the access of the website and the action related to the item correspond to (e.g., match to, is similar to, or otherwise correspond to) one another, the system may aid in reducing any potential fraud.

In some embodiments, token subsystem 112 may obtain an access timestamp of a user accessing an item. For instance, the user may access a website that is associated with an entity, and token subsystem 112 may obtain an access timestamp corresponding to the user's access of the website. In some embodiments, after an activation of an item-restricted access token, detection subsystem 114 may detect candidate items accessible via the website. For instance, detection subsystem 114 may obtain an image stream of the website the user is browsing and may detect candidate items on the website, in accordance with one or more embodiments. In some embodiments, based on the detection of the candidate items, detection subsystem 114 may store candidate item information in system data database 134 for later use when verifying an action related to a candidate item. For example, detection subsystem 114 may store candidate item information for each detected candidate item, where the candidate item information includes one or more item parameters such as the candidate item (e.g., the candidate item identifier) and an access timestamp corresponding to the access of the website by the user.

When the user performs an action related to a candidate item on such website, token subsystem 112 may obtain an action timestamp corresponding to the action related to the candidate item. For example, where a user selects a videogame to play, the token subsystem 112 may record an action timestamp of the user attempting to play the videogame. Token subsystem 112 may then determine whether the action related to the candidate item is valid based on (i) the candidate item corresponding to an item bound to the item-restricted access token and (ii) the action timestamp corresponding to the access timestamp. For example, token subsystem 112 may communicate with detection subsystem 114 to determine whether the candidate item corresponds to at least one item bound to the item-restricted access token, in accordance with one or more embodiments. Additionally, token subsystem 112 may then determine whether the action timestamp (e.g., a timestamp associated with the action related to the candidate item) corresponds to the access timestamp (e.g., the access of the website). For example, in some embodiments, detection subsystem 114 may retrieve the candidate item from system data database 134 to obtain an access timestamp corresponding to the candidate item to compare the access timestamp to the action timestamp corresponding to the candidate item. For instance, the action timestamp may correspond to the access timestamp where the action and the access timestamp match.

However, as users may take time to browse over items available on a website, the action and access timestamps may not exactly match. Therefore, the action and access timestamps may correspond to one another when the respective timestamps satisfy a threshold value. For instance, the action and access timestamps may correspond to one another based on being within 1 second, 2 seconds, 3 seconds, 1 minute, 2 minutes, 3 minutes, or other time metric with one another. In some embodiments, token subsystem 112 may compute a difference between the action timestamp (e.g., a timestamp of the action related to the candidate item) and the access timestamp (e.g., a timestamp of the access of the website) and compare the difference to a threshold value. For example, where the action timestamp is recorded at 3:05 p.m. on a particular date and the access timestamp is recorded at 3:00 p.m. on the same date, the difference may be 5 minutes. Token subsystem 112 may determine such difference and compare it to a threshold value. In some embodiments, the threshold value may be satisfied when the difference is less than the threshold value (e.g., less than 20 minutes, less than 10 minutes, less than 1 minute, less than 30 seconds, less than 20 seconds, etc.). In other embodiments, the threshold value may be satisfied when the difference is within a range of the threshold value (e.g., +/−1 second, +/−2 seconds, +/−1 minute, +/−2 minutes, etc.). Token subsystem 112 may determine whether the difference satisfies the threshold value, and based on the difference satisfying the threshold value, token subsystem 112 may indicate that the action timestamp corresponds to the access timestamp. Thus, the action related to the candidate item may be valid when (i) the candidate item corresponds to at least one item bound to the item-restricted access token and (ii) the action timestamp corresponds to the access timestamp.

In a use case, where the item-restricted access token is a virtual card number, a user may navigate to a merchant's website where products available for purchase are accessible. Token subsystem 112 may record an access timestamp of when the user navigates to such website. Once the user selects a product to purchase (e.g., a purchase request) on the website, token subsystem 112 may record an action timestamp of the purchase request. Token subsystem 112 may then communicate with detection subsystem 114 and determine whether the product the user has selected corresponds to at least one product bound to the item-restricted access token. In response to the product the user has selected corresponding to at least one product bound to the item-restricted access token, token subsystem 112 may then determine whether the access timestamp (e.g., of the user accessing the website) and the action timestamp (of the user selecting the product for purchase) correspond to one another. For example, when the timestamps (i) match or (ii) are within a threshold value of one another, token subsystem 112 may determine that the purchase request of the product is valid, and may allow the user to proceed with purchasing the product.

In some embodiments, validating actions related to candidate items may be validated based on timestamp information associated with different websites or entities. For example, as a user may browse various websites that may be associated with different entities, to reduce the chance of any fraudulent activity when accessing items via the websites, the system may compare timestamp information between the browsing of the first website, the second website, and any action related to an item to ensure that the user that was originally browsing the first website is the same user browsing another website (and ultimately attempts to access an item). For example, in a case where a user browsing the first website leaves the user device, another user may obtain access to the user device, navigate to another website (or alternatively, browse items on the first website) and attempt to access an item on the other website (or first website) for nefarious purposes (e.g., purchase an item with the user's virtual card, access unauthorized multimedia content, etc.). Thus, by validating actions related to candidate items based on timestamp information, potential fraud may be reduced, thereby improving the user experience and increasing item-restricted access token security.

In some embodiments, token subsystem 112 may obtain a first access timestamp that corresponds to access of a first website associated with a first entity, a second access timestamp corresponding to access of a second website associated with a second entity, and an action timestamp corresponding to an action related to a candidate item. Token subsystem 112 may validate the action related to the candidate item based on (i) the candidate item corresponding to an item bound to the item-restricted access token, in accordance with one or more embodiments, (ii) the first access timestamp corresponding to the second access timestamp, and (iii) the action timestamp corresponding to the second access timestamp. For example, the first access timestamp may correspond to the second access timestamp where the first access timestamp matches the second access timestamp (e.g., where the user is browsing items on a first website and immediately navigates to a second website to browse items on the second website). Alternatively, the first access timestamp may correspond to the second access timestamp where the first and second access timestamps satisfy a threshold value. For instance, the first access and second access timestamps may correspond to one another based on being within 1 second, 2 seconds, 3 seconds, 1 minute, 2 minutes, 3 minutes, or other time metric with one another. In some embodiments, token subsystem 112 may compute a difference between the first access timestamp (e.g., a timestamp of the access related to the first website) and the second access timestamp (e.g., a timestamp of the access of the second website) and compare the difference to a threshold value. For example, where the first access timestamp is recorded at 10:05 p.m. on a particular date and the second access timestamp is recorded at 10:00 p.m. on the same date, the difference may be 5 minutes. Token subsystem 112 may determine such difference and compare it to a threshold value. In some embodiments, the threshold value may be satisfied when the difference is less than the threshold value (e.g., less than 20 minutes, less than 10 minutes, less than 1 minute, less than 30 seconds, less than 20 seconds, etc.). In other embodiments, the threshold value may be satisfied when the difference is within a range of the threshold value (e.g., +/−1 second, +/−2 seconds, +/−1 minute, +/−2 minutes, etc.). Token subsystem 112 may determine whether the difference satisfies the threshold value, and based on the difference satisfying the threshold value, token subsystem 112 may indicate that the first access timestamp corresponds to the second access timestamp.

In some embodiments, token subsystem 112 may then determine whether the action timestamp related to the candidate item corresponds to the second access timestamp. For example, the action timestamp related to the candidate item may correspond to the second access timestamp when the respective timestamps match one another. Alternatively, the action timestamp related to the candidate item may correspond to the second access timestamp when a difference between the respective timestamps satisfy a threshold value, in accordance with one or more embodiments.

In one use case, where an item-restricted access token is a virtual card number, a user may browse a first merchant's website for products available for purchase. Token subsystem 112 may record a first access timestamp associated with the user accessing the first merchant's website. In some cases, the user may not find a suitable product to purchase via the first merchant's website, and may navigate to a second merchant's website. Upon navigating to the second merchant's website, token subsystem 112 may record a second access timestamp associated with the user accessing the second merchant's website. The user may select a product the user wishes to purchase via the second merchant's website, and token subsystem 112 may record an action timestamp of the user selecting the product. Alternatively, the user may select the product to add to a virtual shopping cart (e.g., checkout cart), and token subsystem 112 may record an action timestamp of the user when the user accesses their shopping cart to check out. To allow the user to purchase the product (e.g., validate the purchase request action), detection subsystem 114 may then determine whether the product corresponds to at least one item bound to the item-restricted access token. To ensure another user has not replaced the user accessing the first merchant's website, token subsystem 112 may then determine whether the first access timestamp (e.g., associated with access of the first merchant's website) corresponds to the second access timestamp (e.g., associated with the access of the second merchant's website). Token subsystem 112 may then determine whether the action timestamp corresponds to the second access timestamp. For example, to further ensure that there are no nefarious uses of the item-restricted access token, the action timestamp (e.g., related to the purchase request of the product) may be compared to the second access timestamp. For instance, if too much time has elapsed between the user navigating to the second website and attempting to purchase a product from the second website, this may indicate that the user browsing products on the second website has left the user device, and another unauthorized user has since taken over. Thus, where the action timestamp corresponds to the second access timestamp, the system may further reduce potential fraud. Token subsystem 112 may then validate the purchase request based on (i) the product corresponding to at least one item bound to the item-restricted access token, (ii) the first access timestamp corresponding to the second access timestamp, and (iii) the action timestamp matching the second access timestamp.

In some embodiments, token subsystem 112 may perform validation of an action based on determining whether timestamp information of activity data is within a threshold time of an action request. For example, token subsystem 112 may retrieve from system data database 134 a first timestamp associated with activity data. For example, subsequent to system data database 134 returning user activity data based on a query corresponding to an action request, token subsystem 112 may retrieve a first timestamp associated with activity data that corresponds to the action request. For example, the first timestamp may indicate a time at which URL data was obtained when the action request was initiated. Token subsystem 112 may obtain a second timestamp that corresponds to the time at which the action request was received by token subsystem 112. For example, where a malicious actor (e.g., such as a third party user) attempts to effect a validation process, the malicious actor may tamper with an action request. In some cases, the time at which token subsystem 112 receives an action request may subsequently be delayed, which may be an indication of a malicious actor tampering with an action request. Therefore, to ensure proper validation of an action request, token subsystem 112 may compare the time at which the action request was received to the time activity data was obtained. As an example, token subsystem 112 may determine whether the first timestamp associated with the activity data (or alternatively, the URL data) is within a threshold time of the action request. For instance, the threshold time may be a predetermined time, such as 1 second, 2 seconds, 1 minute, 2 minutes, and so on. Based on the first timestamp associated with the activity data being within a threshold time of the action request, token subsystem 112 may provide an indication that the first action is valid.

In a use case, where the action request is a temporary authorization, and the token used in association with the action request is a virtual card number, token subsystem 112 may validate the temporary authorization based on (i) the time at which the temporary authorization was received and (ii) the time at which the activity data was obtained. For example, as previously mentioned, a malicious actor may attempt to tamper with a temporary authorization. For example, the malicious actor may attempt a "man-in-the-middle" attack to obtain financial information of a particular user. In some cases, this may result in a delay of the temporary authorization being received by token subsystem 112. Thus, to help protect user financial information (and to indicate to the user that there may be a malicious actor acting upon their information), token subsystem 112 may compare the time at which the temporary authorization was received to the time at which the activity data was obtained. If the time difference is within a threshold time of one another, token subsystem 112 may validate the temporary authorization. On the contrary, however, if the time difference is not within a threshold time of one another, token subsystem 112 may invalidate the temporary authorization. In some embodiments, based on such invalidation, message subsystem 116 may generate a message to be displayed on a user device to indicate to the user that the temporary authorization was invalid, thus alerting the user of a potential issue.

In some embodiments, token subsystem 112 may perform validation of an action based on whether values associated with user activity data correspond to values associated with action request data. For example, detection subsystem 114 may detect via the user activity data, one or more first values associated with the user activity data. For instance, the first values may represent price information, UPC numbers, a quantity of items, or other values associated with an item. Token subsystem 112 may obtain first action request data from the first action request that indicates a description of the action request. As an example, where the action request is a temporary authorization, token subsystem 112 may communicate with detection subsystem 114 to detect one or more second values (e.g., related to price information, UPC numbers, a quantity of items, etc.) in the description of the action request. Upon detection subsystem 114 returning the second values to token subsystem 112, token subsystem 112 may compare the first values to the second values to determine a match between the first values and the second values. For example, where the activity data includes an item for purchase at a particular price (e.g., $5.00) and the action request description indicates an item purchased with the same price (e.g., $5.00), token subsystem 112 may determine a match between the first value and the second value. Based on such match, token subsystem 112 may validate the first action request (e.g., the temporary authorization). In some embodiments, the match may be between respective values (e.g., where the first value is price information and the second value is price information). In other embodiments, where there are multiple respective values (e.g., price information and quantity information included in the activity data and action request data), each of the respective values may be compared to one another to determine a match. For example, in a use case where the activity data includes a first price and first quantity value related to an item, and the action request data includes a second price and a second quantity value, the first price may be compared to the second price, and the first quantity may be compared to the second quantity to determine a match between the values, respectively. Based on (i) the first price matching the second price value and (ii) the first quantity matching the second quantity value, token subsystem 112 may validate the action request (or alternatively, the action) based on the matching. In this way, actions may be validated on a match between values associated with (i) the user activity data and (ii) the action request to ensure proper validation of action requests.

In some embodiments, an action may be validated based on a determination that the URL data of activity data corresponds to the token. For example, token subsystem 112 may validate an action based on URL data included in activity data corresponding to an entity associated with the token. For example, where the token is an entity-restricted access token, the entity-restricted access token may be associated with a first entity where access to items may be restricted to items being associated with the first entity. Subsequent to performing a query for user activity data based on an action request, token subsystem 112 may validate the action based on (i) the query returning the activity data and (ii) the URL data of the user activity data corresponding to the entity associated with the token. For example, the URL data of the user activity data (or a portion thereof) may correspond to the entity associated with the token based on a match. For instance, token subsystem 112 may retrieve the entity that is associated with the token (e.g., via a token parameter associated with the token) and determine whether there is a match between the URL data of the user activity data and the entity that is associated with the token. Based on such a match, token subsystem 112 may provide an indication that the action is valid. On the contrary, based on token subsystem 112 determining there is not a match, token subsystem 112 may provide an indication that the action is invalid.

In a use case, where the token is a virtual card number, token subsystem 112 may validate a temporary authorization based on URL data included in activity data corresponding to an entity associated with the virtual card number. For example, to avoid false invalidations of temporary authorizations, URL data may aid in the validation process. For instance, in the context of content aggregation platforms, such platform may act as a portal to numerous websites. When a user purchases an item at a merchant website via the aggregation platform, the temporary authorization may include a mismatched merchant identifier. Therefore, by obtaining the user activity data (e.g., including the URL data), URL data included in the activity data may be compared to an entity that is linked (or bound) to the virtual card number to aid in authorizing temporary authorizations. For example, token subsystem 112 may obtain a merchant identifier (e.g., a merchant name, a merchant code, etc.) associated with the virtual card number. Token subsystem 112 may then retrieve a merchant identifier from the URL data associated with the user activity data, and compare the merchant identifier associated with the virtual card number to the merchant identifier of the user activity data. Based on a match between the merchant identifiers, token subsystem 112 may provide an indication that the temporary authorization is valid. Similarly, when token subsystem 112 does not determine a match (e.g., the activity data fails to correspond to the entity associated with the token), token subsystem 112 may provide an indication that the temporary authorization is invalid.

In some instances, however, determining whether there is a match between the URL data of the user activity data and the entity that is associated with the token may be difficult. For example, as the user activity data may be in the format of images, extracted computer code, extracted textual data, or other formats, obtaining a direct match between the URL data and the user activity data may be cumbersome. Thus, as discussed above, token subsystem 112 may rely on one or more prediction models (e.g., machine learning model 302) to determine whether URL data corresponds to an entity that is associated with a token.

In some embodiments, an action may be validated based on a determination that (i) the URL data of activity data corresponds to a first entity associated with the token and (ii) the first URL data corresponding to a second entity indicated in the action, the second entity being different from the first entity. For example, in addition to the foregoing, the URL data of the activity data may correspond to a second entity indicated in the first action. For example, in the context of a content aggregation platform, when a user accesses a website to access an item via the aggregation platform, the URL data of the activity data may correspond to multiple entities (e.g., a first entity and a second entity) that are different from one another. Due to the nature of an aggregation platform, the activity data may include URL data of (i) the aggregation platform itself and (ii) the website from which the user accessed an item. Therefore, when an action request (e.g., temporary authorization) is received by token subsystem 112, the entity associated with the temporary authorization may be different than that of the entity associated with the token. Therefore, to minimize validation errors, token subsystem 112 may validate the action based on (i) a query returning user activity data, (ii) the URL data of the user activity data corresponding to the first entity associated with the token, and (iii) the first URL data corresponding to a second entity indicated in the action, where the second entity is different from the first entity.

In some embodiments, token subsystem 112 may invalidate an action based on user activity data corresponding to known malicious URL data. For example, to improve the user experience and protect users from a data breach, token subsystem 112 may invalidate an action by determining whether user activity data corresponds to a known malicious entity. For example, subsequent to performing a query for user activity data based on an action request, token subsystem 112 may invalidate an action based on URL data of the user activity data corresponding to known malicious URL data. As an example, system data database 134 may store information pertaining to malicious URL data. For instance, system data database 134 may store a set of known malicious URLs, domain names, entity names, company names, or other URL-derived data. In some embodiments, token subsystem 112 may retrieve the URL data of the user activity data and provide the URL data to system data database 134 to query the database to determine whether the URL data of the user activity data corresponds to any known malicious URL data. For example, system data database 134 may return URL corresponding to known malicious URL data. Token subsystem 112 may determine whether the URL data of the user activity data corresponds to the returned known malicious URL data via a direct match (e.g., a string match) or providing (i) the URL data of the user activity data and (ii) the returned malicious URL data to a prediction model to generate a prediction indicating whether the URL data of the user activity data corresponds to the returned malicious URL data. Based on the URL data of the user activity data corresponding to the malicious URL data, token subsystem 112 may invalidate the action, thereby protecting the user from any subsequent data breach and improving the user experience.

Example Flowcharts

Figure 4:
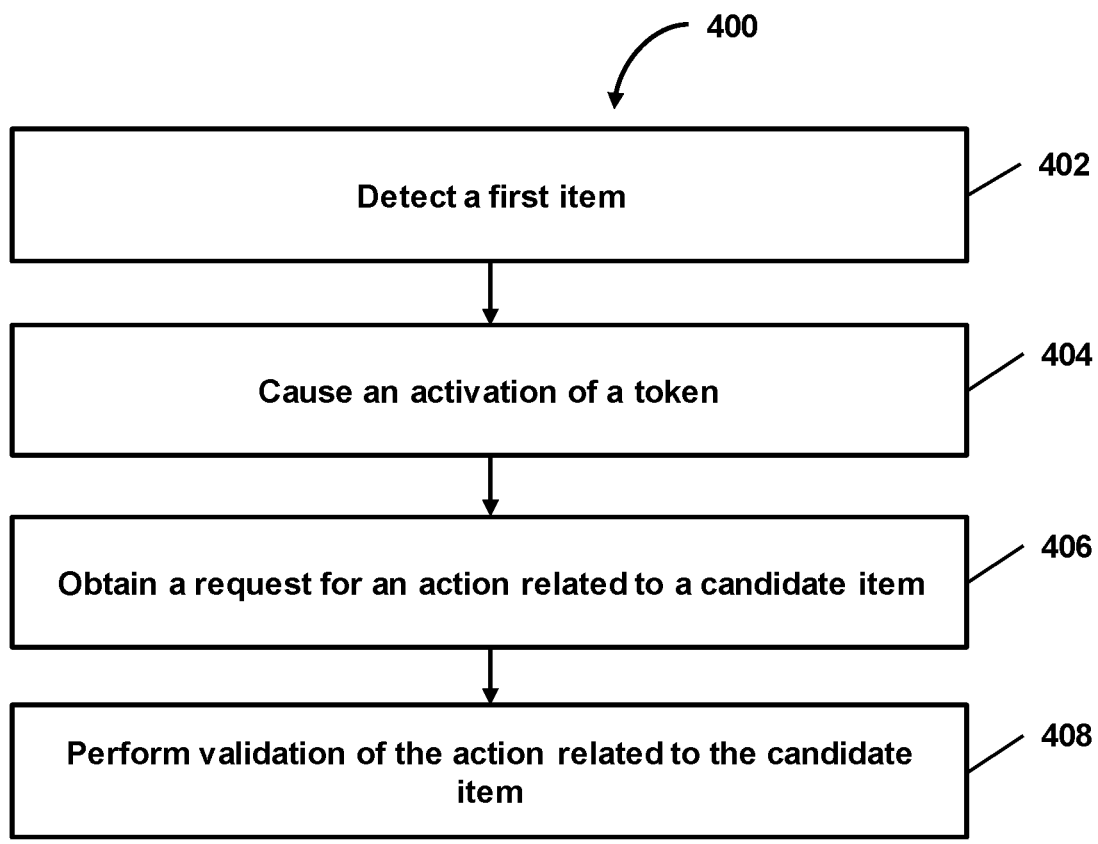
FIG. 4 shows a flowchart of a method for binding one or more items to a restricted access token, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, a first item may be detected. For example, a first item may be accessible via a website that is accessed by a user (or alternatively, a user device). For instance, the first website may be associated with a first entity (e.g., a company, merchant, service provider, organization, or other entity). In some embodiments, a first item may be detected based on one or more extraction techniques. For example, a first item may be detected by extracting code associated with a website. In other embodiments, a first item may be detected by obtaining an image stream from a user device, where the image stream represents a user browsing the first website and selecting the first item. Operation 402 may be performed by a subsystem that is the same as or similar to detection subsystem 114, in accordance with one or more embodiments.

In an operation 404, a token may be activated. For example, a token may be generated, selected, or otherwise activated. For example, after authenticating a user (e.g., of the user device) and detecting a first item, a token may be generated. In some embodiments, the token may represent an item-restricted access token where actions related to items are restricted to items that are bound to the item-restricted access token. As an example, the item-restricted access token may be configured to allow users access to certain items (e.g., those bound to the item-restricted access token), but prevent access to other items (e.g., those not bound to the item-restricted access token). Operation 404 may be performed by a subsystem that is the same as or similar to token subsystem 112, in accordance with one or more embodiments.

In an operation 406, a request for an action related to a candidate item may be obtained. For example, the request may indicate use of an item-restricted access token for accessing the candidate item. For instance, an action may be any interaction that a user, computing system, or service provider may have with an item, such as selecting an item, interacting with an item, viewing an item, gaining access to an item, manipulating an item, transacting with an item (e.g., purchasing the item), or other network operation related to an item. Operation 406 may be performed by a subsystem that is the same as or similar to token subsystem 112, in accordance with one or more embodiments.

In an operation 408, validation of an action related to the candidate item may be performed. For example, a validation process may be performed on the candidate item, where the validation indicates that the action related to the candidate item is valid based on the candidate item corresponding to at least one item bound to the item-restricted access token. For example, the action related to the candidate item may be valid where the candidate item (or another corresponding item) is bound to the item-restricted access token. In some embodiments, validation of the action related to the candidate item may be further based on timestamp information. For example, a timestamp of the access of a website where the candidate item is accessible and a timestamp of the action related to the candidate item may be compared when determining whether the action related to the candidate item is valid. Operation 408 may be performed by a subsystem that is the same as or similar to token subsystem 112, in accordance with one or more embodiments.

Figure 5:
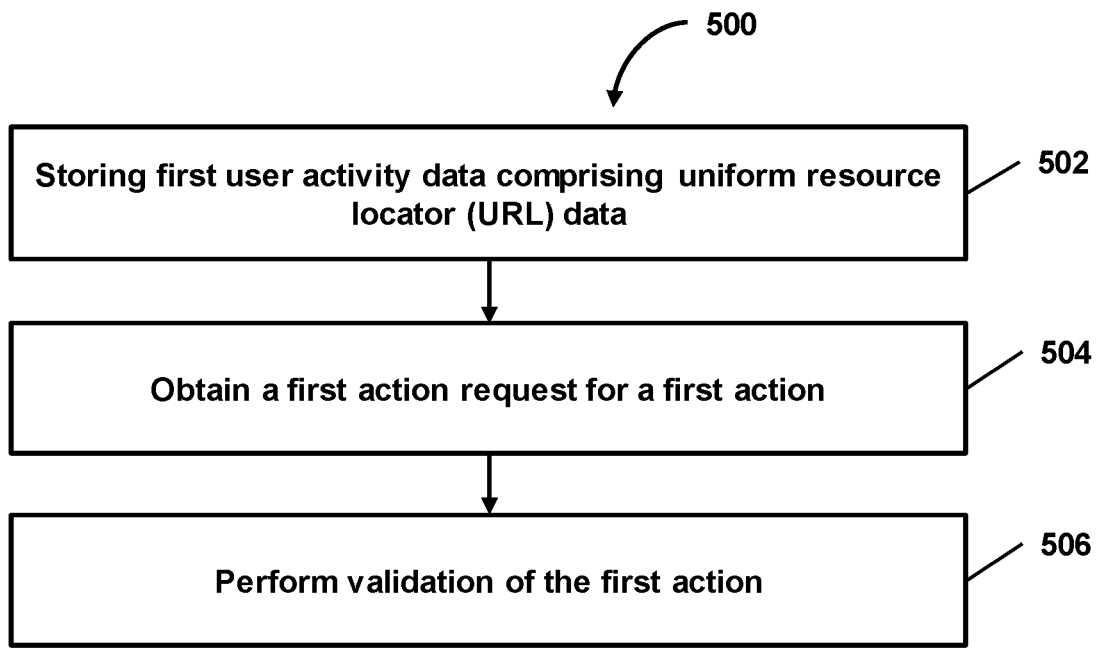
FIG. 5 shows a flowchart of a method for performing validation of actions related to use of a restricted access token, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, first user activity data comprising URL data may be stored. For example, in connection with use by a user of a first token associated with a first entity, first user activity data in association with the user may be stored in a database in association with the first token. For example, the first user activity data may include first URL data and first timestamps associated with the first URL data. Operation 502 may be performed by a subsystem that is the same as or similar to detection subsystem 114, in accordance with one or more embodiments.

In an operation 504, a first action request for a first action may be obtained. For example, an action may be any interaction that a user or computing system may have with an item such as selecting an item, interacting with an item, viewing an item, gaining access to an item, manipulating an item, transacting with an item, a network operation related to an item, or other action associated with an item. As another example, an action request may indicate use of a token for an action. For instance, the first action request may be a temporary authorization. Operation 504 may be performed by a subsystem that is the same as or similar to token subsystem 112, in accordance with one or more embodiments.

In an operation 506, a validation of the first action may be performed. For example, a validation process may validate the first action based on performing a query of a database for user activity data based on the first action request. In some embodiments, an indication may be provided that the first action is valid based on (i) the query returning the first user activity data and (ii) the first URL data corresponding to the first entity associated with the first token. Operation 506 may be performed by a subsystem that is the same as or similar to token subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include item data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware;

some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method comprising: binding a token for accessing an item that corresponds to a linked item; obtaining a request for an action related to a candidate item, the request indicating use of the token for accessing the candidate item; and performing validation of the action related to the candidate item based on the token, wherein the validation indicates that the action related to the candidate item is valid based on a determination that the candidate item corresponds to the linked item.

A2. The method of embodiment A1, further comprising: determining a plurality of item sets comprising a first and second item set, the first item set comprising a first item value associated with the first item and one or more other item values associated with the other items, the second item set comprising the first item value without one or more other values; causing, based on detection of the first item, a message to be presented to a user, the message requesting a user selection of an item set from among the plurality of item sets to which the token is to be bound, wherein binding the token comprises binding, based on the user selection obtained via the message, the token to the user-selected item set.

A3. The method of any of embodiments A1-A2, further comprising: obtaining an access timestamp based on the user accessing a second website associated with a second entity and an action timestamp based on the action related to the candidate item, wherein the validation indicates that the action related to the candidate item is valid based on (i) the candidate item corresponding to the first item of the token and (ii) the action timestamp corresponding to the access timestamp.

A4. The method of any of embodiments A1-A3, further comprising: detecting candidate items accessible via a second entity; and storing, based on the detection of the candidate items, candidate item information, the candidate item information indicating (i) one or more candidate item-related values and (ii) an access timestamp corresponding to the access of the second entity, wherein the validation indicates that the action related to the candidate item is valid based on (i) the candidate item corresponding to the first item of the token and (ii) an action timestamp corresponding to the action matching to the access timestamp.

A5. The method of any of embodiments A1-A4, further comprising: obtaining a first access timestamp corresponding to the access of the first website, a second access timestamp corresponding to access of a second website associated with the second entity, and an action timestamp corresponding to the action; wherein the validation indicates that the action related to the candidate item is valid based on (i) the candidate item corresponding to the first item of the token, (ii) the first access timestamp being within a threshold value of the second access timestamp, and (iii) the action timestamp corresponding to the second access timestamp.

A6. The method of any of embodiments A1-A5, wherein the validation indicates that the action related to the candidate item is valid based on an item value of the candidate item corresponding to an item value of the first item of the token.

A7. The method of any of embodiments A1-A6, wherein the validation indicates that the action related to the candidate item is valid based on the candidate item matching a version of the first item of the token.

A8. The method of any of embodiments A1-A7, wherein the validation further comprises: providing item-related data to a prediction model to train the prediction model; obtaining candidate item-related data; obtaining item-related data corresponding to the first item; providing (i) the candidate item-related data and (ii) the item-related data corresponding to the first item as input to the prediction model to generate an output; and in response to the output indicating that the candidate item corresponds to the first item, validating the action.

A9. The method of any of embodiments A1-A8, wherein the item-related data, the candidate item-related data, and the item-related data corresponding to the first item each comprise at least one of a price, a value, an image, or textual data.

A10. The method of any of embodiments A1-A9, wherein subsequent use of the token is restricted to items that correspond to one or more items bound to the token.

A11. The method of any of embodiments A1-A10, wherein the token comprises an item-restricted access token.

B1. A method comprising: in connection with use of a first token, storing first activity data associated with a user in a database in association with the first token, the first user activity data comprising first URL data; obtaining a first action request for a first action involving use of the first token; and performing validation of the first action by performing a first query of the database for activity data based on the first action request.

B2. The method of embodiment B1, further comprising: providing an indication that the first action is valid based on a determination that the first URL data of the first activity data corresponds to the first token.

B3. The method of any of embodiments B1-B2, further comprising: providing an indication that the first action is invalid based on a determination that the first URL data of the first activity data fails to correspond to the first token.

B4. The method of any of embodiments B1-B3, further comprising: providing an indication that the first action is valid based on (i) the first URL data of the first user activity corresponding to a first entity associated with the token and (ii) the first URL data corresponding to a second entity indicated in the first action, the second entity being different from the first entity.

B5. The method of any of embodiments B1-B4, further comprising: in connection with use by the user of the first token, storing second user activity data associated with the user in a database in association with the first token, the second user activity data comprising second URL data; obtaining a second action request for a second action involving use of the first token; performing validation of the second action by performing a second query of the database for activity data based on the second action request; and providing an indication that the second action is invalid based on the second user activity data corresponding to a known malicious URL data.

B6. The method of any of embodiments B1-B5, wherein performing validation of the first action further comprises: retrieving from the database, a timestamp associated with the first URL data; determining whether the timestamp associated with the first URL data is within a threshold time of the first action request; and providing the indication that the first action is valid in response to the timestamp associated with the first URL data is within the threshold time of the first action request.

B7. The method of any of embodiments B1-B6, wherein performing the validation of the first action further comprises: detecting one or more first values associated with the user activity data; obtaining first action request data; determining, based on the first action request data, one or more second values; comparing the one or more first values to the one or more second values to determine a match; and validating the first action request in response to a match between the one or more first values and the one or more second values.

B8. The method of any of embodiments B1-B7, wherein performing the first query comprises: obtaining the first entity; querying the database based on the first entity and the time of the first action request; determining, based on the query, whether (i) the first entity corresponds to the first URL data and (ii) the first action request is within a threshold time of a first timestamp associated with the first URL data; and returning the user activity data in response to (i) the first entity corresponding to the first URL data and (ii) the first action request being within the threshold time of the first timestamp.

B9. The method of any of embodiments B1-B8, further comprising: providing training data to a prediction model to train the prediction model; obtaining the first entity; providing the first user activity data to the prediction model to generate an output indicating a second entity included in the first user activity data; and determining, based on the output, whether the second entity corresponds to the first entity.

B10. The method of any of embodiments B1-B9, wherein the first user activity data comprises at least one of an image, textual data, or multimedia content associated with activities of a user.

B11. The method of any of embodiments B1-B10, wherein the first token comprises an entity-restricted access token.

C1. A tangible, non-transitory, machine-readable medium storing instructions that, when executed by a data processing apparatus, cause the data processing apparatus to perform operations comprising those of any of the foregoing method embodiments A1-A11 or B1-B11.

C2. A system comprising: one or more processors; and memory storing instructions that, when executed by the processors, cause the processors to effectuate operations comprising those of any of the foregoing method embodiments A1-A12 or B11-B11.

What is claimed is:

1. A token generation and authentication system for facilitating item-related network operations across different third-party entity systems using item-restricted access tokens in place of one or more primary access tokens of a user account, the system comprising:
one or more hardware processors and non-transitory computer readable media comprising instructions that, when executed by the one or more hardware processors, cause operations comprising:
detecting, based on an image stream from a user device, first items accessible via a first website associated with a first third-party entity, the image stream representing a user of the user device browsing the first website and selecting the first items;
binding, based on authentication of the user and the detection of the first items, an item-restricted access token for use restricted to network operations related to items matching the first items, wherein the item-restricted access token is linked to a primary access token of an account of the user;
after the binding of the item-restricted access token, obtaining a request for a network operation related to candidate items accessible via a second website that is (i) not affiliated with the first website and (ii) associated with a second third-party entity different from the first third-party entity, the request indicating use of the item-restricted access token for accessing the candidate items; and
performing validation of the network operation related the candidate items based on the item-restricted access token such that:
(i) the validation indicates that the network operation related to the candidate items is valid in response to a determination that each item identifier of the candidate items is the same as at least one item identifier of the first items of the item-restricted access token; and
(ii) the validation indicates that the network operation related to the candidate items is invalid in response to a determination that at least one item identifier of the candidate items fails to match any item identifier of the first items of the item-restricted access token,
wherein the candidate items are provided by the second third-party entity for the user in response to the validation indicating that the network operation related to the candidate items is valid.

2. The system of claim 1, the operations further comprising:
after an activation of the item-restricted access token, detecting, based on monitoring of a subsequent image stream associated with the user, the candidate items accessible via the second website associated with the second third-party entity, the subsequent image stream representing the user browsing the candidate items on the second website; and
storing, based on the detection of the candidate items, candidate item information in association with the item-restricted access token in a database, the candidate item information indicating (i) item identifiers of the candidate items and (ii) a browsing timestamp corresponding to the browsing of the second website,
wherein the validation indicates that the network operation related to the candidate items is valid in response to a determination that (i) each of the indicated item identifiers of the candidate items is the same as at least one item identifier of the first items of the item-restricted access token and (ii) an action timestamp corresponding to the network operation matches the browsing timestamp.

3. A method comprising:

detecting a first item accessible via a first website accessed by a user, the first website being associated with a first entity;

binding, based on authentication of the user and the detection of the first item, an item-restricted token for accessing an item corresponding to the first item;

after the binding of the item-restricted token, obtaining a request for an action related to a candidate item accessible via a second entity different from the first entity, the request indicating use of the item-restricted token for accessing the candidate item;

providing training data to a prediction model to train the prediction model, wherein the training data comprises item-related training data; and performing validation of the action related to the candidate item based on providing, (i) candidate item-related data corresponding to the candidate item and (ii) item-related data corresponding to the first item obtained via the item-restricted token, as input to the trained prediction model to generate an output indicating whether the candidate item corresponds to the first item, wherein the validation validates the action related to the candidate item based on the output of the prediction model indicating that the candidate item corresponds to the first item of the item-restricted token.

4. The method of claim 3, further comprising:

determining a plurality of items sets comprising first and second item sets, the first item set comprising a first identifier associated with the first item and one or more other identifiers associated with other items accessible via the first website, the second item set comprising the first identifier without the one or more other identifiers; and causing, based on the detection of the first item, a notification to be presented at a user device of the user, the notification requesting a user selection of an item set from among the plurality of item sets to which the item-restricted token is to be bound, wherein binding the item-restricted token comprises binding, based on the user selection obtained via the notification, the item-restricted token to a user-selected item set corresponding to the user selection.

5. The method of claim 3, further comprising:

obtaining an access timestamp corresponding to access by the user of a second website associated with the second entity and an action timestamp corresponding to the action related to the candidate item, wherein the validation validates the action related to the candidate item based on (i) the candidate item matching the first item of the item-restricted token and (ii) the action timestamp matching the access timestamp.

6. The method of claim 3, further comprising:

after an activation of the item-restricted token, detecting candidate items accessible via a second website associated with the second entity accessed by the user; and storing, based on the detection of the candidate items, candidate item information in association with the user in a database, the candidate item information indicating (i) the candidate item and (ii) an access timestamp corresponding to the access of the second website by the user, wherein the validation validates the action related to the candidate item based on (i) the candidate item matching the first item of the item-restricted token and (ii) an action timestamp corresponding to the action matching the access timestamp.

7. The method of claim 3, further comprising:

obtaining a first access timestamp corresponding to the access of the first website by the user, a second access timestamp corresponding to access by the user of a second website associated with the second entity, and an action timestamp corresponding to the action;

wherein the validation validates the action related to the candidate item based on (i) the candidate item matching the first item of the item-restricted token, (ii) the first access timestamp being within a time threshold of the second access timestamp, and (iii) the action timestamp matching the second access timestamp.

8. The method of claim 3, wherein the validation validates the action related to the candidate item based on an item identifier of the candidate item being the same as an item identifier of the first item of the item-restricted token.

9. The method of claim 3, wherein the validation validates the action related to the candidate item based on the candidate item matching a version of the first item of the item-restricted token.

10. The method of claim 3, further comprising:

in response to the output indicating that the candidate item corresponds to the first item, validating the action related to the candidate item, wherein the action is to access the candidate item.

11. The method of claim 3, wherein the item-related training data, the item-related data corresponding to the first item, and the candidate item-related data each comprise at least one of a price, an identifier, an image, or webpage text.

12. One or more non-transitory computer-readable media comprising instructions that, when executed by one or more processors, cause operations comprising:

detecting a first item accessible via a first website accessed by a user, the first website being associated with a first entity;

determining a plurality of item sets comprising first and second item sets, the first item set comprising a first identifier associated with the first item and one or more other identifiers associated with other items accessible via the first website, the second item set comprising the first identifier without the one or more other identifiers;

causing, based on authentication of the user and the detection of the first item, a notification to be presented on a user device associated with the user, the notification indicating activation of an item-restricted token and requesting a user-selection of an item set from among the plurality of item sets to which the item-restricted token is to be bound, the activation of the item-restricted token enabling access of items corresponding to one or more items of a user-selected item set obtained via the notification;

after the activation of the item-restricted token, obtaining a request for an action related to a candidate item, the request indicating use of the item-restricted token for accessing the candidate item; and performing validation of the action related to the candidate item based on the item-restricted token, wherein the validation indicates that the action related to the candidate item is valid based on a determination that the candidate item corresponds to a respective item of the user-selected item set.

13. The non-transitory computer-readable media of claim 12, wherein the instructions that, when executed by the one or more processors, cause operations further comprising:

receiving, via the notification, an indication of the user-selected item set based on a user selection of the user-selected item set; and binding, based on the user selection, the item-restricted token to the user-selected item set.

14. The non-transitory computer-readable media of claim 12, wherein the instructions that, when executed by the one or more processors, cause operations further comprising:

obtaining an access timestamp corresponding to access by the user of a second website associated with a second entity and an action timestamp corresponding to the action related to the candidate item, wherein the validation indicates that the action related to the candidate item is valid based on (i) the candidate item corresponding to the first item of the item-restricted token and (ii) the action timestamp corresponding to the access timestamp.

15. The non-transitory computer-readable media of claim 12, wherein the instructions that, when executed by the one or more processors, cause operations further comprising:

after the activation of the item-restricted token, detecting candidate items accessible via a second website associated with a second entity accessed by the user; and storing, based on the detection of the candidate items, candidate item information in association with the user in a database, the candidate item information indicating (i) the candidate item and (ii) an access timestamp corresponding to the access of the second website by the user, wherein the validation indicates that the action related to the candidate item is valid based on (i) the candidate item matching the first item of the item-restricted token and (ii) an action timestamp corresponding to the action matching the access timestamp.

16. The non-transitory computer-readable media of claim 12, wherein the instructions that, when executed by the one or more processors, cause operations further comprising:

obtaining a first access timestamp corresponding to the access of the first website by the user, a second access timestamp corresponding to access by the user of a second website associated with a second entity, and an action timestamp corresponding to the action;

wherein the validation indicates that the action related to the candidate item is valid based on (i) the candidate item matching the first item of the item-restricted token, (ii) the first access timestamp being within a time threshold of the second access timestamp, and (iii) the action timestamp matching the second access timestamp.

17. The non-transitory computer-readable media of claim 12, wherein the validation indicates that the action related to the candidate item is valid based on an item identifier of the candidate item being the same as an item identifier of the first item of the item-restricted token.

18. The non-transitory computer-readable media of claim 12, wherein the validation indicates that the action related to the candidate item is valid based on the candidate item matching a version of the first item of the item-restricted token.

19. The non-transitory computer-readable media of claim 12, wherein the validation further comprises:

providing training data to a prediction model to train the prediction model, wherein the training data comprises item-related data;

obtaining, based on the candidate item, candidate item-related data;

obtaining, based on the item-restricted token, item-related data corresponding to the first item;

providing (i) the candidate item-related data and (ii) the item-related data corresponding to the first item as input to the prediction model to generate an output indicating whether the candidate item corresponds to the first item; and in response to the output indicating that the candidate item corresponds to the first item, validating the action related to the candidate item.

20. The non-transitory computer-readable media of claim 19, wherein the item-related data, the item-related data corresponding to the first item, and the candidate item-related data each comprise at least one of a price, an identifier, an image, or webpage text.

* * * * *